United States Patent
Dikici et al.

(10) Patent No.: US 12,333,711 B2
(45) Date of Patent: Jun. 17, 2025

(54) METHODS FOR CREATING PRIVACY-PROTECTING SYNTHETIC DATA LEVERAGING A CONSTRAINED GENERATIVE ENSEMBLE MODEL

(71) Applicant: Ohio State Innovation Foundation, Columbus, OH (US)

(72) Inventors: Engin Dikici, Dublin, OH (US); Luciano Prevedello, Dublin, OH (US); Matthew Bigelow, Hilliard, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 376 days.

(21) Appl. No.: 17/401,543

(22) Filed: Aug. 13, 2021

(65) Prior Publication Data

US 2022/0051060 A1   Feb. 17, 2022

Related U.S. Application Data

(60) Provisional application No. 63/065,015, filed on Aug. 13, 2020.

(51) Int. Cl.
*G06N 3/045*    (2023.01)
*G06F 18/21*    (2023.01)
(Continued)

(52) U.S. Cl.
CPC .......... *G06T 7/0012* (2013.01); *G06F 18/214* (2023.01); *G06F 18/217* (2023.01);
(Continued)

(58) Field of Classification Search
CPC ......... G06T 7/0012; G06T 2207/10081; G06T 2207/10088; G06T 2207/10104;
(Continued)

(56) References Cited

U.S. PATENT DOCUMENTS

| | | | |
|---|---|---|---|
| 11,222,288 B2 * | 1/2022 | Baker | G06N 20/20 |
| 11,475,276 B1 * | 10/2022 | Shrivastava | G06N 3/094 |

(Continued)

OTHER PUBLICATIONS

Y. Wang, L. Zhang, and J. Van De Weijer, "Ensembles of generative adversarial networks," arXiv Prepr. arXiv1612.00991 (2016) (Year: 2016).*

(Continued)

*Primary Examiner* — Nancy Bitar
*Assistant Examiner* — Dustin Bilodeau
(74) *Attorney, Agent, or Firm* — Meunier Carlin & Curfman LLC

(57) ABSTRACT

Described herein are methods for generating and using a constrained ensemble of GANs. The constrained ensemble of GANs can be used to generate synthetic data that is (1) representative of the original data, and (2) not closely resembling the original data. An example method includes generating a constrained ensemble of GANs, where the constrained ensemble of GANs includes a plurality of ensemble members. The method also includes analyzing performance of the constrained ensemble of GANs by comparing a temporary performance metric to a baseline performance metric, and halting generation of the constrained ensemble of GANs in response to the analysis. The method also includes generating a synthetic dataset using the constrained ensemble of GANs. The synthetic dataset is sufficiently similar to the original dataset to permit data sharing for research purposes but alleviates privacy concerns due to differences in mutual information between synthetic and real data.

12 Claims, 15 Drawing Sheets

(51) Int. Cl.
G06F 18/214 (2023.01)
G06F 18/243 (2023.01)
G06N 3/04 (2023.01)
G06N 3/088 (2023.01)
G06N 20/20 (2019.01)
G06T 7/00 (2017.01)
G06T 11/60 (2006.01)
G06V 10/20 (2022.01)

(52) U.S. Cl.
CPC ............. *G06F 18/243* (2023.01); *G06N 3/04* (2013.01); *G06N 3/045* (2023.01); *G06N 3/088* (2013.01); *G06T 11/60* (2013.01); *G06V 10/255* (2022.01); *G06T 2207/10081* (2013.01); *G06T 2207/10088* (2013.01); *G06T 2207/10104* (2013.01); *G06T 2207/10132* (2013.01); *G06T 2207/30096* (2013.01)

(58) Field of Classification Search
CPC . G06T 2207/10132; G06T 2207/20081; G06T 2207/20084; G06F 18/214; G06F 18/217; G06N 3/045; G06N 3/088; G06N 3/08; G06N 3/0475; G06V 10/82; G06V 30/18057; G06V 2201/03
See application file for complete search history.

(56) References Cited

U.S. PATENT DOCUMENTS

| | | | |
|---|---|---|---|
| 11,526,991 | B2 | 12/2022 | Ito et al. |
| 11,826,201 | B2 | 11/2023 | Errico et al. |
| 2013/0129223 | A1 | 5/2013 | Takacs et al. |
| 2020/0265318 | A1* | 8/2020 | Malkiel ................. G06N 3/047 |
| 2020/0380675 | A1 | 12/2020 | Golden et al. |
| 2021/0303933 | A1 | 9/2021 | Kim et al. |
| 2021/0383534 | A1 | 12/2021 | Tadross |
| 2022/0309653 | A1 | 9/2022 | Hassanpour et al. |
| 2022/0335601 | A1 | 10/2022 | Kang et al. |

OTHER PUBLICATIONS

A. Radford, L. Metz, and S. Chintala, "Unsupervised representation learning with deep convolutional generative adversarial networks," arXiv Prepr. arXiv1511.06434 (2015) (Year: 2015).*
L. Nayak, E. Q. Lee, and P. Y. Wen, "Epidemiology of brain metastases," Curr. Oncol. Rep., vol. 14, No. 1, pp. 48-54, 2012.
B. C. Yoon, A. F. Saad, P. Rezaii, M. Wintermark, G. Zaharchuk, and M. Iv, "Evaluation of Thick-Slab Overlapping MIP Images of Contrast-Enhanced 3D T1-Weighted CUBE for Detection of Intracranial Metastases: A Pilot Study for Comparison of Lesion Detection, Interpretation Time, and Sensitivity with Nonoverlapping CUBE MIP, CUBE, a," Am. J. Neuroradiol., vol. 39, No. 9, pp. 1635-1642, 2018.
Ú. Pérez-Ramírez, E. Arana, and D. Moratal, "Computer-aided detection of brain metastases using a three-dimensional template-based matching algorithm," in Proc. Annu. Int. Conf. IEEE Eng. Med. Biol. Soc., 2014, pp. 2384-2387.
R. D. Ambrosini, P. Wang, and W. G. O'dell, "Computer-aided detection of metastatic brain tumors using automated three-dimensional template matching," J. Magn. Reson. Imaging, vol. 31, No. 1, pp. 85-93, 2010.
R. Farjam, H. A. Parmar, D. C. Noll, C. I. Tsien, and Y. Cao, "An approach for computer-aided detection of brain metastases in post-Gd T1-W MRI," Magn. Reson. Imaging, vol. 30, No. 6, pp. 824-836, 2012.
S. Yang, Y. Nam, M.-O. Kim, E. Y. Kim, J. Park, and D.-H. Kim, "Computer-aided detection of metastatic brain tumors using magnetic resonance black-blood imaging," Invest. Radiol., vol. 48, No. 2, pp. 113-119, 2013.

H. Khotanlou, O. Colliot, J. Atif, and I. Bloch, "3D brain tumor segmentation in MRI using fuzzy classification, symmetry analysis and spatially constrained deformable models," Fuzzy Sets Syst., vol. 160, No. 10, pp. 1457-1473, 2009.
D. Dera, N. Bouaynaya, and H. M. Fathallah-Shaykh, "Automated robust image segmentation: Level set method using nonnegative matrix factorization with application to brain MRI," Bull. Math. Biol., vol. 78, No. 7, pp. 1450-1476, 2016.
T. Sugimoto, S. Katsuragawa, T. Hirai, R. Murakami, and Y. Yamashita, "Computerized detection of metastatic brain tumors on contrast-enhanced 3D MR images by using a selective enhancement filter," in Proc. World Congr. Med. Phys. Biomed. Eng., 2009, pp. 2070-2072.
Y. LeCun, L. Bottou, Y. Bengio, P. Haffner, and others, "Gradient-based learning applied to document recognition," Proc. IEEE, vol. 86, No. 11, pp. 2278-2324, 1998.
S. Bakas et al., "Identifying the best machine learning algorithms for brain tumor segmentation, progression assessment, and overall survival prediction in the BRATS challenge," arXiv Prepr. arXiv1811.02629, 2018.
G. Litjens et al., "A Survey on Deep Learning in Medical Image Analysis," Med. Image Anal., vol. 42, 2017.
M. Losch, "Detection and segmentation of brain metastases with deep convolutional networks," M.S. thesis, KTH, Computer Vision and Active Perception, CVAP, 2015.
O. Charron, A. Lallement, D. Jarnet, V. Noblet, J.-B. Clavier, and P. Meyer, "Automatic detection and segmentation of brain metastases on multimodal MR images with a deep convolutional neural network," Comput. Biol. Med., vol. 95, 2018.
K. Kamnitsas et al., "Efficient multi-scale 3D CNN with fully connected CRF for accurate brain lesion segmentation," Med. Image Anal., vol. 36, pp. 61-78, 2017.
Y. Liu et al., "A deep convolutional neural network-based automatic delineation strategy for multiple brain metastases stereotactic radiosurgery," PLoS One, vol. 12, No. 10, p. e0185844, 2017.
B. H. Menze et al., "The multimodal brain tumor image segmentation benchmark (BRATS)," IEEE Trans. Med. Imaging, vol. 34, No. 10, pp. 1993-2024, 2014.
E. Grøvik, D. Yi, M. Iv, E. Tong, D. L. Rubin, and G. Zaharchuk, "Deep learning enables automatic detection and segmentation of brain metastases on multi-sequence MRI," arXiv Prepr. arXiv1903.07988, 2019.
C. Szegedy et al., "Going deeper with convolutions," in The IEEE Conference on Computer Vision and Pattern Recognition (CVPR), 2015, pp. 1-9.
E. McTyre, J. Scott, and P. Chinnaiyan, "Whole brain radiotherapy for brain metastasis," Surg. Neurol. Int., vol. 4, No. Suppl 4, p. S236, 2013.
T. Lindeberg, "Image matching using generalized scale-space interest points," J. Math. Imaging Vis., vol. 52, No. 1, pp. 3-36, 2015.
T. Lindeberg, "Scale selection properties of generalized scale-space interest point detectors," J. Math. Imaging Vis., vol. 46, No. 2, pp. 177-210, 2013.
C.-P. Yu, G. Ruppert, R. Collins, D. Nguyen, A. Falcao, and Y. Liu, "3D blob based brain tumor detection and segmentation in MR images," in Proc. IEEE 11th Int. Symp. Biomed. Imag., 2014, pp. 1192-1197.
S. Wang and R. M. Summers, "Machine learning and radiology," Med. Image Anal., vol. 16, No. 5, pp. 933-951, 2012.
F. Milletari, N. Navab, and S.-A. Ahmadi, "V-Net: Fully Convolutional Neural Networks for Volumetric Medical Image Segmentation," 2016, pp. 565-571.
A. Dosovitskiy, P. Fischer, J. T. Springenberg, M. Riedmiller, and T. Brox, "Discriminative unsupervised feature learning with exemplar convolutional neural networks," IEEE Trans. Pattern Anal. Mach. Intell., vol. 38, No. 9, pp. 1734-1747, 2015.
O. Ronneberger, P. Fischer, and T. Brox, "U-net: Convolutional networks for biomedical image segmentation," in Proc. Int. Conf. Med. Image Comput. Comput.-Assisted Intervent., 2015, pp. 234-241.
X. Yang et al., "Co-trained convolutional neural networks for automated detection of prostate cancer in multi-parametric MRI," Med. Image Anal., vol. 42, pp. 212-227, 2017.

(56) References Cited

OTHER PUBLICATIONS

J. Duchon, "Splines minimizing rotation-invariant semi-norms in Sobolev spaces," in Constructive theory of functions of several variables, Springer, 1977, pp. 85-100.
M. H. Le et al., "Automated diagnosis of prostate cancer in multi-parametric MRI based on multimodal convolutional neural networks," Phys. Med. Biol., vol. 62, No. 16, p. 6497, 2017.
P. Y. Simard, D. Steinkraus, and J. C. Platt, "Best practices for convolutional neural networks applied to visual document analysis," in Seventh International Conference on Document Analysis and Recognition, 2003. Proceedings., 2003, vol. 1, pp. 958-963.
N. Robitaille, A. Mouiha, B. Crépeault, F. Valdivia, and S. Duchesne, "Tissue-based MRI intensity standardization: Application to multicentric datasets," J. Biomed. Imaging, vol. 2012, p. 4, 2012.
M. Shah et al., "Evaluating intensity normalization on MRIs of human brain with multiple sclerosis," Med. Image Anal., vol. 15, No. 2, pp. 267-282, 2011.
J. D. Christensen, "Normalization of brain magnetic resonance images using histogram even-order derivative analysis," Magn. Reson. Imaging, vol. 21, No. 7, pp. 817-820, 2003.
B. M. Ellingson et al., "Comparison between intensity normalization techniques for dynamic susceptibility contrast (DSC)-MRI estimates of cerebral blood volume (CBV) in human gliomas," J. Magn. Reson. Imaging, vol. 35, No. 6, pp. 1472-1477, 2012.
L. G. Nyúl, J. K. Udupa, and X. Zhang, "New variants of a method of MRI scale standardization," IEEE Trans. Med. Imaging, vol. 19, No. 2, pp. 143-150, 2000.
S. Roy, A. Carass, and J. L. Prince, "Patch based intensity normalization of brain MR images," in Proc. IEEE 10th Int. Symp. Biomed. Imag., 2013, pp. 342-345.
A. Galdran et al., "Data-driven color augmentation techniques for deep skin image analysis," arXiv Prepr. arXiv1703.03702, 2017.
X. Glorot and Y. Bengio, "Understanding the difficulty of training deep feedforward neural networks," in Proc. 13th Int. Conf. Artif. Intell. Statist., 2010, pp. 249-256.
M. Demirer et al., "A user interface for optimizing radiologist engagement in image-data curation for artificial intelligence," Radiol. Artif. Intell. Pap. RYAI-18-0095.
J. Pluim, J. Maintz, and M. Viergever, "Mutual-Information-Based Registration of Medical Images: A Survey," Med. Imaging, IEEE Trans., vol. 22, pp. 986-1004, 2003.
F. Pedregosa et al., "Scikit-learn: Machine learning in Python," J. Mach. Learn. Res., vol. 12, No. Oct, pp. 2825-2830, 2011.
D. Kingma and J. Ba, "Adam: A Method for Stochastic Optimization," Int. Conf. Learn. Represent., 2014.
B. J. Erickson, P. Korfiatis, Z. Akkus, and T. L. Kline, "Machine learning for medical imaging," Radiographics, vol. 37, No. 2, pp. 505-515, 2017.
J. N. van Rijn and F. Hutter, "Hyperparameter importance across datasets," in Proc. 24th ACM SIGKDD Int. Conf. Knowl. Discovery Data Mining, 2018, pp. 2367-2376.
R. K. Srivastava, K. Greff, and J. Schmidhuber, "Training very deep networks," in Advances in neural information processing systems, 2015, pp. 2377-2385.
K. He, X. Zhang, S. Ren, and J. Sun, "Deep residual learning for image recognition," in Proceedings of the IEEE conference on computer vision and pattern recognition, 2016, pp. 770-778.
G. Huang, Z. Liu, L. Van Der Maaten, and K. Q. Weinberger, "Densely connected convolutional networks," in Proceedings of the IEEE conference on computer vision and pattern recognition, 2017, pp. 4700-4708.
J. Deng, W. Dong, R. Socher, L.-J. Li, K. Li, and L. Fei-Fei, "Imagenet: A large-scale hierarchical image database," in 2009 IEEE conference on computer vision and pattern recognition, 2009, pp. 248-255.
K. Weiss, T. M. Khoshgoftaar, and D. Wang, "A survey of transfer learning," J. Big data, vol. 3, No. 1, p. 9, 2016.
M. H. Hesamian, W. Jia, X. He, and P. Kennedy, "Deep Learning Techniques for Medical Image Segmentation: Achievements and Challenges," J. Digit. Imaging, pp. 1-15, 2019.

A. A. Taha and A. Hanbury, "Metrics for evaluating 3D medical image segmentation: Analysis, selection, and tool," BMC Med. Imaging, vol. 15, No. 1, p. 29, 2015.
T. Hastie, R. Tibshirani, and J. Friedman, "Kernel Density Estimation and Classification," in The elements of statistical learning: Data mining, inference, and prediction, Springer, 2009, pp. 208-212.
W. Liu et al., "A survey of deep neural network architectures and their applications," Neurocomputing 234, 11-26, Elsevier (2017) [doi:10.1016/j.neucom.2016.12.038].
D. Shen, G. Wu, and H.-I. Suk, "Deep learning in medical image analysis," Annu. Rev. Biomed. Eng. 19, 221-248, Annual Reviews (2017) [doi:doi:10.1146/annurev-bioeng-071516-044442].
V. Sze et al., "Efficient processing of deep neural networks: A tutorial and survey," Proc. IEEE 105(12), 2295-2329, Ieee (2017) [doi:10.1109/JPROC.2017.2761740].
S. Nass, L. Levit, and L. Gostin, Beyond the HIPAA Privacy Rule: Enhancing Privacy, Improving Health Through Research, in Beyond the HIPAA Privacy Rule: Enhancing Privacy, Improving Health Through Research, The National Academies Press, Washington, DC (2009) [doi:10.17226/12458].
R. C. Petersen et al., "Alzheimer's disease neuroimaging initiative (ADNI): clinical characterization," Neurology 74(3), 201-209, Lippincott Williams and Wilkins (2010) [doi:10.1212/WNL.0b013e3181cb3e25].
L. Oakden-Rayner, "Exploring Large-scale Public Medical Image Datasets," Acad. Radiol. 27(1), 106-112, Elsevier (2019) [doi:10.1016/j.acra.2019.10.006].
K. Clark et al., "The Cancer Imaging Archive (TCIA): maintaining and operating a public information repository," J. Digit. Imaging 26(6), 1045-1057, Springer (2013) [doi:10.1007/s10278-013-9622-7].
P. Dluhos et al., "Multi-center Machine Learning in Imaging Psychiatry: A Meta-Model Approach," Neuroimage 155 (2017) [doi:10.1016/j.neuroimage.2017.03.027].
I. Goodfellow et al., "Generative Adversarial Networks," Adv. Neural Inf. Process. Syst. 3 (2014).
E. Tzeng et al., "Adversarial discriminative domain adaptation," in Proceedings of the IEEE Conference on Computer Vision and Pattern Recognition, pp. 7167-7176 (2017) [doi:10.1109/CVPR.2017.316].
M. Frid-Adar et al., "GAN-based Synthetic Medical Image Augmentation for increased CNN Performance in Liver Lesion Classification," Neurocomputing (2018) [doi:10.1016/j.neucom.2018.09.013].
C. Bowles et al., "GAN augmentation: augmenting training data using generative adversarial networks," arXiv Prepr. arXiv1810.10863 (2018).
C. Han et al., "Combining Noise-to-Image and Image-to-Image GANs: Brain MR Image Augmentation for Tumor Detection," IEEE Access 7, 1 (2019) [doi:10.1109/ACCESS.2019.2947606].
A. Madani et al., "Semi-supervised learning with generative adversarial networks for chest X-ray classification with ability of data domain adaptation," 2018, 1038-1042 [doi:10.1109/ISBI.2018.8363749].
H. Salehinejad et al., "Generalization of Deep Neural Networks for Chest Pathology Classification in X-Rays Using Generative Adversarial Networks," 2018 [doi:10.1109/ICASSP.2018.8461430].
R. Arandjelović and A. Zisserman, "Object discovery with a copy-pasting gan," arXiv Prepr. arXiv1905.11369 (2019).
D. Lee et al., "Context-Aware Synthesis and Placement of Object Instances," in Proceedings of the 32nd International Conference on Neural Information Processing Systems, pp. 10414-10424, Curran Associates Inc., Red Hook, NY, USA (2018) [doi:doi:10.5555/3327546.3327701].
Y. Wang, L. Zhang, and J. Van De Weijer, "Ensembles of generative adversarial networks," arXiv Prepr. arXiv1612.00991 (2016).
E. Dikici et al., "Automated Brain Metastases Detection Framework for T1-Weighted Contrast-Enhanced 3D MRI," IEEE J. Biomed. Heal. Informatics, 1 (Oct. 2020) [doi:10.1109/JBHI.2020.2982103].
X. Wu, K. Xu, and P. Hall, "A survey of image synthesis and editing with generative adversarial networks," Tsinghua Sci. Technol. 22(6), 660-674 (2017) [doi:10.23919/TST.2017.8195348].

(56) References Cited

OTHER PUBLICATIONS

Z. Pan et al., "Recent Progress on Generative Adversarial Networks (GANs): A Survey," IEEE Access PP 1 (2019) [doi:10.1109/ACCESS.2019.2905015].

X. Yi, E. Walia, and P. Babyn, "Generative Adversarial Network in Medical Imaging: A Review," Med. Image Anal. 58, 101552 (2019) [doi:10.1016/j.media.2019.101552].

X. Wang and A. Gupta, "Unsupervised Learning of Visual Representations Using Videos," in 2015 IEEE International Conference on Computer Vision (ICCV), pp. 2794-2802 (2015) [doi:10.1109/ICCV.2015.320].

R. F. Woolson, "Wilcoxon Signed-Rank Test," in Wiley Encyclopedia of Clinical Trials, pp. 1-3, American Cancer Society (2008) [doi:10.1002/9780471462422.eoct979].

R. Polikar, "Ensemble based systems in decision making," IEEE Circuits Syst. Mag. 6(3), 21-45, IEEE (2006) [doi:10.1109/MCAS.2006.1688199].

O. Sagi and L. Rokach, "Ensemble learning: A survey," Wiley Interdiscip. Rev. Data Min. Knowl. Discov. 8(4), e1249, Wiley Online Library (2018) [doi:10.1002/widm.1249].

L. Theis, A. van den Oord, and M. Bethge, "A note on the evaluation of generative models," in International Conference on Learning Representations (2016).

D. Geman et al., "Visual Turing test for computer vision systems," Proc. Natl. Acad. Sci. U. S. A. 112 (2015) [doi:10.1073/pnas.1422953112].

M. Heusel et al., "GANs trained by a two time-scale update rule converge to a local Nash equilibrium," in Advances in Neural Information Processing Systems 2017—Decem, pp. 6627-6638 (2017) [doi:10.5555/3295222.3295408].

K. Shmelkov, C. Schmid, and K. Alahari, "How good is my GAN?," in The European Conference on Computer Vision (ECCV) (2018).

A. Radford, L. Metz, and S. Chintala, "Unsupervised representation learning with deep convolutional generative adversarial networks," arXiv Prepr. arXiv1511.06434 (2015).

M. J. M. Chuquicusma et al., "How to fool radiologists with generative adversarial networks? a visual turing test for lung cancer diagnosis," in 2018 IEEE 15th international symposium on biomedical imaging (ISBI 2018), pp. 240-244 (2018).

A. Plassard et al., "Learning Implicit Brain MRI Manifolds with Deep Learning," in Proceedings of SPIE—the International Society for Optical Engineering 10574, p. 56 (2018) [doi:10.1117/12.2293515].

T. Hastie, R. Tibshirani, and J. Friedman, "Linear Methods for Regression," in The elements of statistical learning: Data mining, inference, and prediction, pp. 43-94, Springer (2009).

L. van der Maaten and G. Hinton, "Visualizing data using t-SNE," J. Mach. Learn. Res. 9, 2579-2605 (2008).

Araujo, A., Norris, W., Sim, J., 2019. Computing receptive fields of convolutional neural networks. Distill 4, e21.

Dikici, Engin, et al. "Constrained Generative Adversarial Network Ensembles for Sharable Synthetic Data Generation." arXiv preprint arXiv:2003.00086 (submitted Feb. 28, 2020).

Q. Mao et al., "Mode seeking generative adversarial networks for diverse image synthesis," in Proceedings of the IEEE Conference on Computer Vision and Pattern Recognition, pp. 1429-1437 (2019).

Z. Lin et al., "Pacgan: The power of two samples in generative adversarial networks," IEEE J. Sel. Areas Inf. Theory 1(1), 324-335, IEEE (2020).

S.-W. Park, J.-H. Huh, and J.-C. Kim, "Began v3: Avoiding Mode Collapse in GANs Using Variational Inference," Electronics 9(4), 688, Multidisciplinary Digital Publishing Institute (2020).

B. Adlam et al., "Learning gans and ensembles using discrepancy," in Advances in Neural Information Processing Systems, pp. 5796-5807 (2019).

P. Zhong et al., "Rethinking generative mode coverage: A pointwise guaranteed approach," in Advances in Neural Information Processing Systems, pp. 2088-2099 (2019).

A. Ghosh et al., "Multi-agent diverse generative adversarial networks," in Proceedings of the IEEE conference on computer vision and pattern recognition, pp. 8513-8521 (2018).

T.-H. Yu, O. Woodford, and R. Cipolla, "A Performance Evaluation of Volumetric 3D Interest Point Detectors," Int. J. Comput. Vis. 102, 180-197, Springer (2013) [doi:10.1007/s11263-012-0563-2].

I. Melekhov, J. Kannala, and E. Rahtu, "Siamese network features for image matching," in 2016 23rd International Conference on Pattern Recognition (ICPR), pp. 378-383 (2016).

C. Baur, S. Albarqouni, and N. Navab, "MelanoGANs: high resolution skin lesion synthesis with GANs," arXiv Prepr. arXiv1804.04338 (2018).

E. Dikici et al., "Automated Brain Metastases Detection Framework for T1-Weighted Contrast-Enhanced 3D MRI," arXiv preprint arXiv:1908.04701 (submitted Aug. 13, 2019).

E. Dikici et al., "Augmented Networks for Faster Brain Metastases Detection in T1-Weighted Contrast-Enhanced 3D MRI," arXiv preprint arXiv:2105.13406 (submitted May 27, 2021).

Non-Final Office Action in connection to U.S. Appl. No. 17/401,536, dated Dec. 27, 2023.

Interview Summary in connection to U.S. Appl. No. 17/401,536, dated Mar. 11, 2024.

* cited by examiner

| Sensitivity % | Baseline | cGANe1 | cGANe5 | cGANe10 | cGANe20 | cGANe30 | cGANe40 |
|---|---|---|---|---|---|---|---|
| 75 | 1.90 | --- | 16.02 | 10.60 | 6.62 | 4.26 | 3.19 |
| 80 | 2.96 | --- | --- | 12.82 | 9.56 | 6.24 | 4.32 |
| 85 | 5.85 | --- | --- | --- | 13.42 | 8.26 | 6.22 |
| 90 | 9.12 | --- | --- | --- | --- | 12.47 | 9.53 |

*FIG. 9*

| Sensitivity % | Baseline | GANe1 | GANe5 | GANe10 | GANe20 | GANe30 | GANe40 |
|---|---|---|---|---|---|---|---|
| 75 | 1.90 | --- | --- | --- | 14.16 | 8.97 | 8.04 |
| 80 | 2.96 | --- | --- | --- | --- | 10.22 | 9.45 |
| 85 | 5.85 | --- | --- | --- | --- | 13.81 | 11.66 |
| 90 | 9.12 | --- | --- | --- | --- | --- | 16.03 |

*FIG. 10*

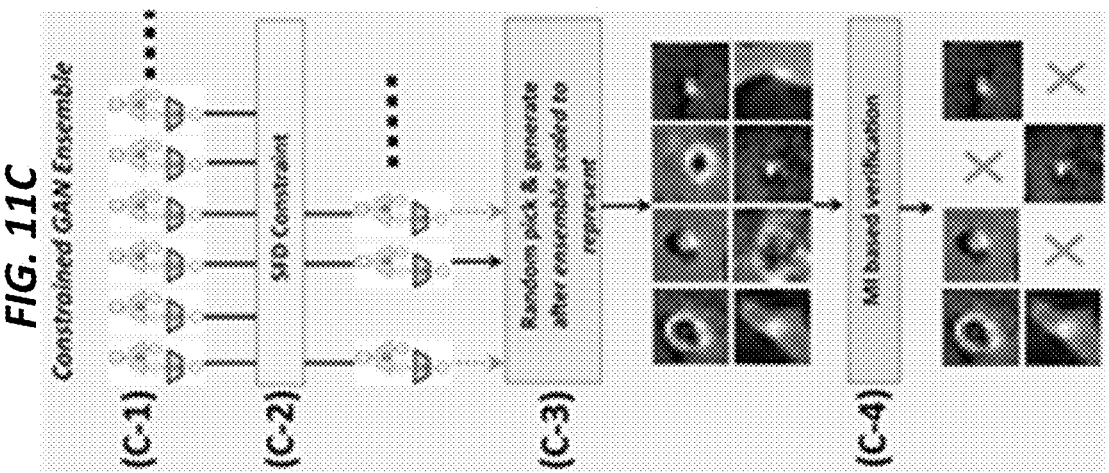
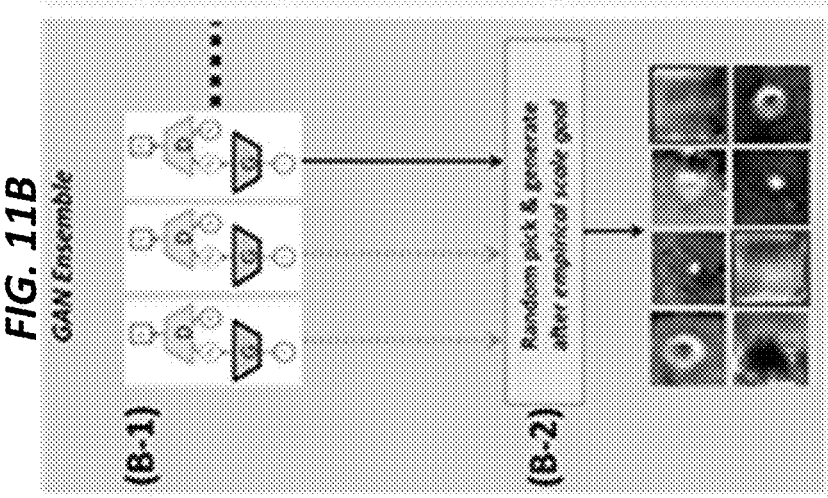
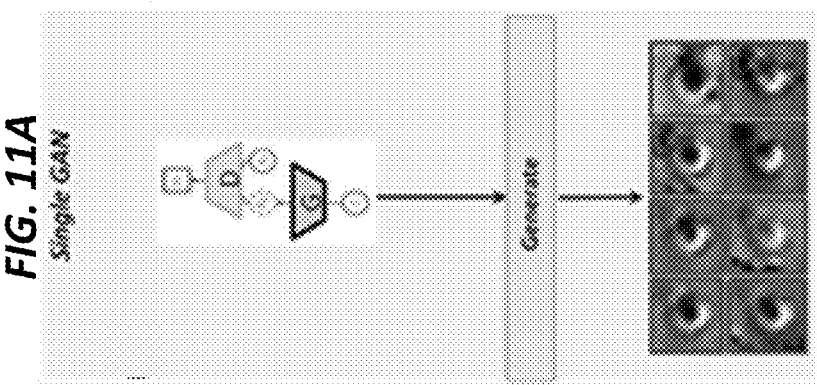
FIG. 11C Constrained GAN Ensemble
FIG. 11B GAN Ensemble
FIG. 11A Single GAN

METHODS FOR CREATING PRIVACY-PROTECTING SYNTHETIC DATA LEVERAGING A CONSTRAINED GENERATIVE ENSEMBLE MODEL

CROSS-REFERENCE TO RELATED APPLICATIONS

This application claims the benefit of U.S. provisional patent application No. 63/065,015, filed on Aug. 13, 2020, and titled "SYSTEMS FOR AUTOMATED LESION DETECTION AND RELATED METHODS," the disclosure of which is expressly incorporated herein by reference in its entirety.

BACKGROUND

The neural-networks with deeper (i.e., with higher numbers of layers) and progressively more sophisticated architectures revolutionized the field of computer vision over the last decade[1]. These mathematical models, also referred to as Deep Neural Networks (DNNs), were utilized for various medical imaging applications including the segmentation/extraction of regions of interests, the detection of formations, and the classification of medical images and/or their parts[2, 3]. As DNNs are highly parametric (i.e., requiring a vast amount of parameters to be optimized), the accuracy and generalizability of the developed models heavily depend on the scale of the used datasets[4]. However, the sharing and usage of medical imaging data are limited due to various laws and regulations, which are necessities as patient privacy, and the institutions' data ownership rights need to be protected[5]. While there are multiple successful initiatives for aggregating multi-institutional public datasets[6-8], access to large-scale datasets collected from selected modalities representing specific medical conditions is not always possible[10].

One way to partially tackle the data deficiency problem is augmenting the institution's own limited imaging data with the synthetic ones, commonly generated based on the originals. Generative Adversarial Networks (GANs)[10], which exploits adversarial loss functions to generate realistic synthetic data[11], were utilized for the augmentation of medical imaging data sets previously[12-16]. However, as reported by Bowles et al.[13], GANs generated data is commonly not representative enough to replace the original data; thus, they were used as a complementary tool to maximize the gain from the original data by smoothing the information domain with more samples. Furthermore, GANs have the potential to generate synthetic images that are identical with or closely resembling the original images [17, 18], making their outputs not always sharable with other institutions.

SUMMARY

Described herein are methods for generating and using a constrained ensemble of GANs. The constrained ensemble of GANs can be used to generate synthetic data that is (1) representative of the original data, and (2) not closely resembling the original data.

In one aspect, an example computer-implemented method for generating synthetic image data is described. The method includes maintaining an image dataset including a plurality of images, and generating a plurality of synthetic images using a constrained generative ensemble model, wherein the constrained generative ensemble model is trained using the image dataset.

Optionally, the constrained generative ensemble model includes a plurality of generative adversarial networks (GANs). Additionally, each GAN includes a respective generator neural network and a respective discriminator neural network.

Alternatively or additionally, the synthetic images are significantly different than the images in the image dataset.

Alternatively or additionally, the image dataset includes magnetic resonance imaging (MRI) images, computed tomography (CT) images, positron emission tomography (PET)-CT images, three-dimensional (3D) mammography images, ultrasound images, or x-ray images.

Alternatively or additionally, the method optionally further includes training a machine learning algorithm using the synthetic images generated by the constrained generative ensemble model.

In another aspect, an example computer-implemented method for generating an ensemble of generative adversarial networks (GANs) is described. The method includes generating a constrained ensemble of GANs, where the constrained ensemble of GANs includes a plurality of ensemble members. The method also includes analyzing performance of the constrained ensemble of GANs by comparing a temporary performance metric to a baseline performance metric, and halting generation of the constrained ensemble of GANs in response to the analysis.

Additionally, the method further includes receiving a request for synthetic data; and generating, in response to the request, the synthetic data using a randomly-selected ensemble member from the constrained ensemble of GANs.

In some implementations, generation of the constrained ensemble of GANs is halted when a difference between the temporary performance metric and the baseline performance metric is less than or equal to a performance gap threshold. Optionally, performance of the constrained ensemble of GANs is analyzed using an N-fold cross validation, bootstrapping, or hold out technique. Alternatively or additionally, the analysis is iteratively performed after generation of a new ensemble member. Alternatively or additionally, the analysis is periodically performed after generation of a plurality of new ensemble members.

In some implementations, the method further includes detecting a poorly-converged ensemble member candidate; and excluding the poorly-converged ensemble member candidate from the constrained ensemble of GANs. Optionally, the poorly-converged ensemble member candidate is detected using a sampled Fréchet distance metric.

In some implementations, the method further includes validating an output of the constrained ensemble of GANs. Optionally, the output of the constrained ensemble of GANs is validated using a visual resemblance test.

Alternatively or additionally, each member of the constrained ensemble of GANs includes a respective generator neural network and a respective discriminator neural network.

Optionally, the method further includes training a machine learning algorithm using the synthetic data generated by the constrained ensemble of GANs.

Optionally, the method further includes providing access to the synthetic data generated by the constrained ensemble of GANs.

In yet another aspect, an example computer-implemented method for training a machine learning algorithm using synthetic image data is described. The method includes generating an ensemble of generative adversarial networks (GANs). The method also includes generating a synthetic dataset including a plurality of synthetic images using the constrained ensemble of GANs, and training a machine learning algorithm using the synthetic images generated by the constrained ensemble of GANs.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

(FIG. 5A) SFD between the original and sample set of generated data were computed periodically, in every 50 epochs; the minimal distance was reported at the measurement point C-2. (FIG. 5B) Binary cross-entropy loss for the generator and discriminator networks are plotted. (FIG. 5C) For three reference points (i.e., C-1, C-2, and C-3), mid-axial slices of randomly generated BM region volumes are shown: In C-1 and C-3, the samples do not resemble real BM appearance; C-1 presents limited variability, and C-3 has multiple samples with checkerboard-like artifacts. In C-2, the samples resemble the actual BM appearances; they are in various dimensions/contrasts, some even have cystic formations.

(FIG. 6H) The average curves for the baseline and cGANe setups.

FIG. 9 is Table 1, which shows average number of false positives (AFP) at specific sensitivity percentages are reported for the baseline, cGANe1, cGANe5, cGANe10, cGANe20, and cGANe40 setups. Note empty fields for cGANe1, cGANe5, cGANe10 and cGANe20 indicate that the respective cGANe did not achieve 75%, 80%, 85% and 90% detection sensitivities respectively.

FIG. 10 is Table 2, which shows average number of false positives (AFP) at specific sensitivity percentages are reported for the baseline, GANe1, GANe5, GANe10, GANe20, GANe30, and GANe40 setups. Note empty fields for cGANe1, cGANe5, cGANe10, cCANe20 and cGANe30 indicate that the respective cGANe did not achieve 75%, 80%, 85% and 90% detection sensitivities respectively.

FIGS. 11A-11C illustrate a GAN, GAN ensemble, constrained GAN ensemble, respectively, for medical image synthesis. (FIG. 11A) A single GAN is generated from the training data, it is susceptible to generate mode-collapsed and non-representative data (images with red frames). (FIG. 11B) GAN ensemble is a collection of GANs scaled to an empirical size without a representativeness objective (B-1); it may also produce non-representative data (B-2). (FIG. 11C) Constrained GAN ensemble picks its members with SFD constraint (C-1, C-2), and scales with representativeness objective (C-3). The generated samples are further verified to protect patient privacy (C-4).

DETAILED DESCRIPTION

Figure 1:
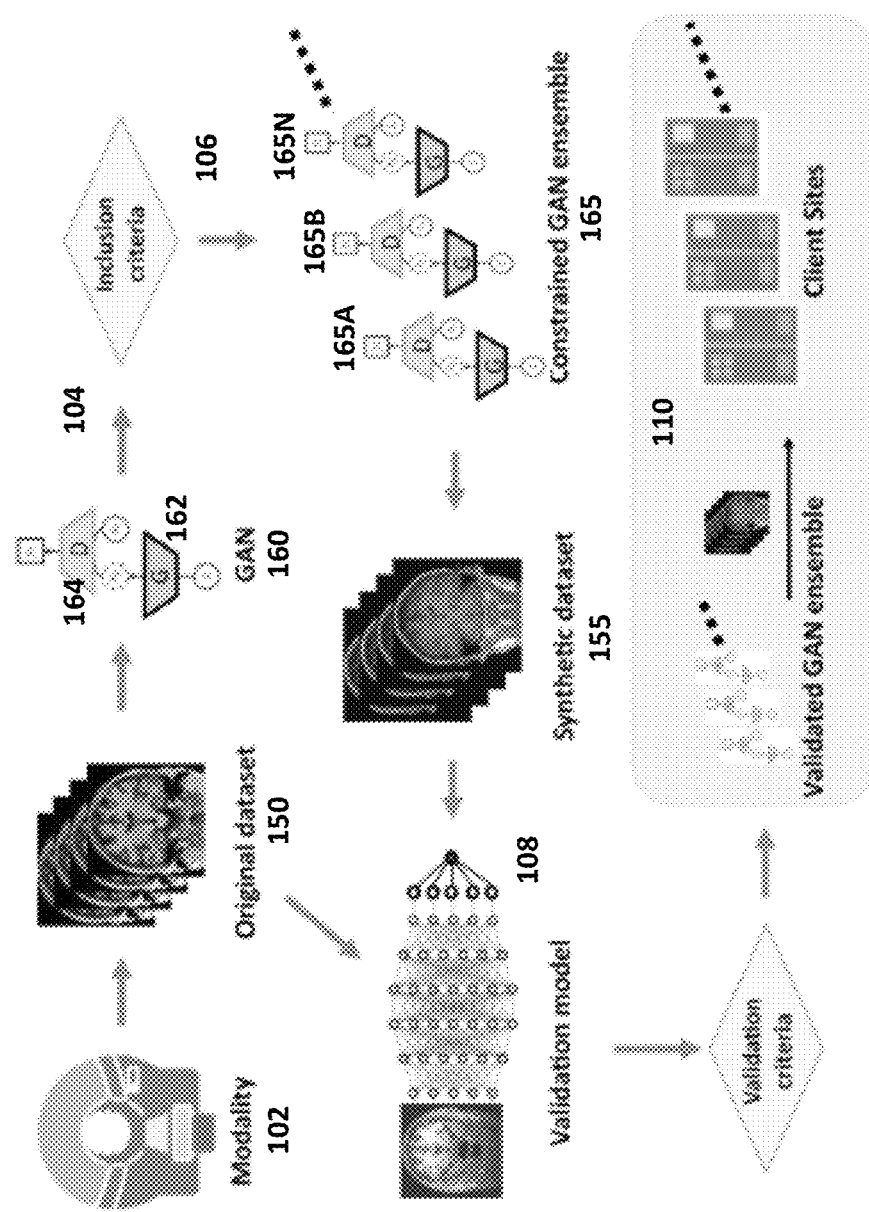
FIG. 1 illustrates a constrained generative adversarial network (GAN) ensemble and related operations according to implementations described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. As used herein, the terms "about" or "approximately", when used in reference to a linear dimension or volume, mean within plus or minus 10 percentage of the referenced linear dimension or volume. While implementations will be described for medical images, it will become evident to those skilled in the art that the implementations are not limited thereto, but are applicable for other image data or other data types.

Described herein is a constrained ensemble of GANs approach that provides a framework to generate synthetic data that is (1) representative, i.e., the synthetic data users can produce comparable results with the original data users, and (2) not closely resembling the originals. Hence, the synthetic data is sharable. Accordingly, the ensemble of GANs approach[19], having the premise of improving the generalizability of GANs, is further advanced with the aforementioned aspects. First, an adaptive ensemble scaling strategy is introduced with the objective of representativeness. Next, the ensemble membership is constrained by a sampled Fréchet distance (SFD) metric for eliminating poorly converged candidates to allow healthy ensemble growth. Finally, a mutual information-based verification stage is embedded into the framework to ensure the generated data does not include identical, or closely resembling, samples with the originals. In an ideal deployment scenario, multiple institutions would generate synthetic datasets with the presented approach, then share it with other institutions; this would enable research projects to be performed with vast synthetic datasets vetted to represent their originals.

Referring now to FIG. 1, a constrained generative adversarial network (GAN) ensemble and related operations are shown. This disclosure contemplates that the steps of the operations shown in FIG. 1 can be performed using one or more computing devices (e.g., at least one processor and memory) such as the computing device of FIG. 2. The constrained GAN ensemble (or constrained ensemble of GANs) generated according to the operations described with respect to FIG. 1 can be used to generate a synthetic dataset. Such synthetic dataset achieves two objectives. First, the synthetic dataset is sufficiently similar to an original dataset such that the synthetic dataset can be used to produce comparable results in research as is achieved with real data. In other words, the synthetic dataset is 'representative' of real data. In the Example below, a lesion detection algorithm trained with a synthetic dataset generated with a constrained GAN ensemble exhibits comparable performance results as a lesion detection algorithm trained with real data. Second, the synthetic data is sufficiently different from real data (e.g., not identical or too closely resembling real data). In other words, the synthetic data significantly different than the original data. As used herein, significantly different means that the synthetic and real data are different in regards to a mutual information based metric. In this way, the synthetic dataset is shareable (i.e., the synthetic dataset retains privacy).

At step 102, an original dataset (or "data set") 150 is obtained. This disclosure contemplates that the original dataset 150 is acquired using an imaging system and maintained in memory and/or storage of one or more computing devices. This disclosure contemplates that the original dataset 150 can be stored locally or remotely with respect to the one or more computing devices implementing the operations described herein. Additionally, as described herein, the original dataset 150 includes a plurality of medical images. This disclosure contemplates that medical images can be of any imaging modality including, but not limited to, one-dimensional (1D), two-dimensional (2D), three-dimensional (3D), 1D plus time, 2D plus time, and 3D plus time (i.e., 4D) images. Example medical images are a magnetic resonance imaging (MRI) images, a computed tomography (CT) images, positron emission tomography (PET)-CT images, three-dimensional (3D) mammography (or tomosynthesis) images, ultrasound images, or x-ray images. Optionally, in some implementations, the medical images are contrast-enhanced T1-weighted MRI images, for example as described in the Example below.

The medical images in the original dataset 150 capture a portion of anatomy (e.g., brain, lung, liver, etc.). For example, a medical image may include one or more lesions. As described herein, in some implementations, the lesions are metastases, which are malignant growths distant from the primary site of cancer. It should be understood that medical images may include metastases located in other organs such as the lung or liver and/or may include other types of lesions (e.g., multiple sclerosis). Optionally, in some implementations, the lesions are brain metastatic (BM) lesions (see Example). It should be understood that BM lesions are provided only as examples. This disclosure contemplates that the lesions may be located in other parts of the body including, but not limited to, a lung or liver. Alternatively, this disclosure contemplates that the lesions may be benign lesion, premalignant lesions, or another non-cancerous lesion (e.g., lesion in the central nervous system caused by MS). This disclosure contemplates that the original dataset 150 may include imaging modalities other than those provided as examples, other types of images (e.g., non-medical images), and/or other types of data.

Figures 3A, 3B:
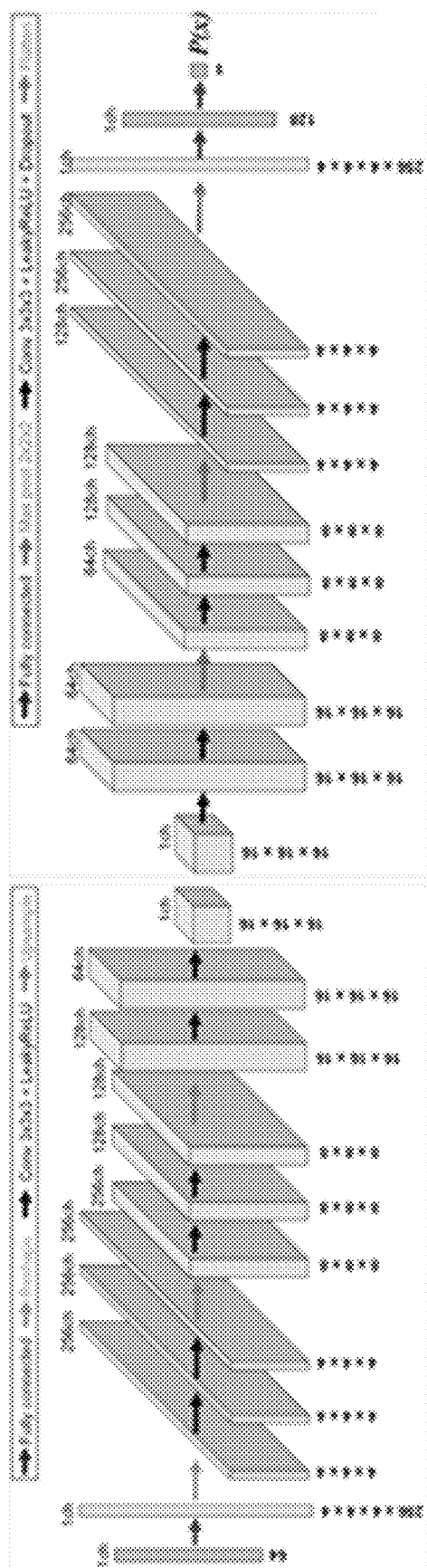
FIGS. 3A-3B are diagrams illustrating example networks according to implementations described herein. The generator (FIG. 3A) and discriminator (FIG. 3B) networks of the used 3D DCGAN: Classical contracting and expanding architectures are deployed with 3D convolution layers.

At step 104, a constrained ensemble of generative adversarial networks (GANs) is generated. A constrained ensemble of GANs 165 includes a plurality of ensemble members 165A, 1656, 165N. Each ensemble member is a GAN, which includes a generator neural network 162 and a discriminator neural network 164. GANs are machine learning frameworks that use deep learning techniques such as convolutional neural networks (CNNs). Example generator and discriminator CNNs are shown in FIGS. 3A and 3B, respectively. In a GAN, a first artificial neural network (i.e., generator neural network 162) is trained with a dataset (e.g., original dataset 150) to generate new examples (e.g., synthetic data), and a second artificial neural network (e.g., discriminator neural network 164) is trained with a dataset (e.g., original dataset 150) to classify the new examples (e.g., synthetic data) as either real (i.e., contained in the original dataset 150) or fake (i.e., synthetic). The generator and discriminator neural networks are trained together with the same dataset (e.g., original dataset 150) in an adversarial manner until the generator neural network 162 is capable of 'fooling' the discriminator neural network 164 by sufficient metric. GANs are well known in the art and therefore not described in further detail herein.

An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can optionally be arranged in a plurality of layers such as input layer, output layer, and one or more hidden layers. Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement a function (e.g., sigmoid function or rectified linear unit (ReLU) function), and provide an output in accordance with the function. Additionally, each node is associated with a respective weight. ANNs are trained with a data set to minimize the cost function, which is a measure of the ANN's performance. Training algorithms include, but are not limited to, backpropagation. The training algorithm tunes the node weights and/or bias to minimize the cost function. It should be understood that any algorithm that finds the minimum of the cost function can be used to for training the ANN. A convolutional neural network (CNN) is a type of deep neural network that has been applied, for example, to image analysis applications. Unlike a traditional neural networks, each layer in a CNN has a plurality of nodes arranged in three dimensions (width, height, depth).

CNNs can include different types of layers, e.g., convolutional, pooling, and fully-connected (also referred to herein as "dense") layers. A convolutional layer includes a set of filters and performs the bulk of the computations. A pooling layer is optionally inserted between convolutional layers to reduce the computational power and/or control overfitting (e.g., by downsampling). A fully-connected layer includes neurons, where each neuron is connected to all of the neurons in the previous layer. The layers are stacked similar to traditional neural networks.

As described herein, the number of ensemble members in the constrained ensemble of GANs 165 increases during step 104. This is shown in FIG. 1 by the increase in the number of ensemble members between GAN 160 (i.e., single ensemble member) and the constrained ensemble of GANs 165 (i.e., three ensemble members). Growth of the constrained ensemble of GANs 165 is limited based on respective analyses of ensemble performance and new ensemble member candidates as described in detail below. It should be understood that the constrained ensemble of GANs 165 in FIG. 1 with three ensemble members 165A, 165B, 165N is provided only as an example. This disclosure contemplates that the constrained ensemble of GANs 165 can include more or less than three ensemble members. FIGS. 11A-11C illustrate a single GAN, an ensemble of GANs, and a constrained ensemble of GANs, respectively. The operations described with regard to FIG. 1 can be used to generate a constrained ensemble of GANs (e.g., as shown in FIG. 11C). Additionally, in the Example below, implementations are described with five (e.g., cGANe5), ten (e.g., cGANe10), twenty (e.g., cGANe20), thirty (e.g., cGANe30), and forty (e.g., cGANe40) ensemble members. It should also be understood that the constrained ensemble of GANs can include a different number of ensemble members than those provided in the Examples, e.g., 2, 3, 4, 5, . . . , 35, 36, 37, 38, 39, 40, or more ensemble members.

At step 106, performance of the constrained ensemble of GANs 165 is analyzed. For example, such analysis can include comparing a temporary performance metric (see e.g., Equation-3 in the Example) to a baseline performance metric (see e.g., Equation-2 in the Example). For example, the synthetic dataset generated by the constrained ensemble of GANs may be used for a research purpose such as statistical modeling. In the Example below, the research purpose is creating a lesion detection algorithm. In this application, the temporary performance metric is a measure of the lesion detection algorithm's performance when trained using synthetic data generated by the constrained ensemble of GANs, and the baseline performance metric is a measure of the lesion detection algorithm's performance when trained using real data. As described below, it is desirable for the lesion detection algorithm's performance to be comparable in both cases. This indicates that the synthetic dataset generated by the constrained ensemble of GANs 165 is representative of real data.

In some implementations, the analysis at step 106 is iteratively performed after generation of each new ensemble member (which is more computationally intensive than periodic analysis). In other implementations, the analysis at step 106 is periodically performed after generation of a plurality of new ensemble members (which is less computationally intensive than iterative analysis). Growth of the constrained ensemble of GANs 165 is halted in response to the analysis at step 106. If the temporary performance metric, which changes with growth, diverges from the baseline performance metric, then there may be improper GAN selection formulation or parameterization and/or inadequate training data. In this case, growth should be stopped. In some implementations, growth of the constrained ensemble of GANs 165 is halted when a difference between the temporary performance metric (see e.g., Equation-3 in the Example) and the baseline performance metric (see e.g., Equation-2 in the Example) is less than or equal to a performance gap threshold (see e.g., $\epsilon$ in the Example). This disclosure contemplates that performance of the constrained ensemble of GANs 165 can be analyzed using an N-fold cross validation or bootstrapping technique. It should be understood that N-fold cross validation or bootstrapping technique are provided only as example performance metrics. This disclosure contemplates using metrics other than N-fold cross validation or bootstrapping technique, for example, a hold out method (e.g., partitioning dataset into training and testing sets).

Additionally, a poorly-converged ensemble member candidate is detected at step 106. This ensures healthy growth of the constrained ensemble of GANs 165. Optionally, the poorly-converged ensemble member candidate is detected using a Fréchet distance metric such as a sampled Fréchet distance (SFD) (see e.g., Equation-5 in the Example). It should be understood that a sampled Fréchet distance metric, which can be used with high-dimensional data such as medical image data in the Example, is provided only as an example and that other metrics may be used, for example, depending on the data type. Other metrics for detecting poorly-converged ensemble members include, but are not limited to, inception score, mode score, AM score, maximum mean discrepancy, or Wasserstein distance. One of skill in the art would understand which metrics are appropriate given the data type. The poorly-converged ensemble member candidate is excluded from the constrained ensemble of GANs 165. In other words, such poorly-converged ensemble member candidate is not added to the constrained ensemble of GANs 165.

At step 108, an output of the constrained ensemble of GANs 165 is validated. The output of the constrained ensemble of GANs 165 is a synthetic dataset 155. In the Example, the medical images of the synthetic dataset 155 are compared to the original dataset 150. The comparison ensures that the medical images of the synthetic dataset 155 are not copies of the original dataset 150. In other words, step 108 detects synthetic data that is identical or too closely resembling the original data, which protects patient privacy. As discussed above, the constrained ensemble of GANs 165 is designed to produce synthetic data that is representative of, but not identical to, the real data. The output of the constrained ensemble of GANs 165 is validated using a visual resemblance test. An example visual resemblance test includes determining a mutual information (MI)-based metric (see e.g., Equation-6 in the Example), which assesses similarity between synthetic and original (or real) data. In the Example, the MI-based metric is described and tested for possible geometric (or rigid) transformations between real and synthetic images. This disclosure contemplates that an MI-based metric can be computed to assess non-geometric (or non-rigid) transformations between real and synthetic images. It should be understood that an MI-based metric is provided only as an example visual resemblance test and that other metrics may be used.

The constrained ensemble of GANs 165 and/or the synthetic dataset 155 has applications, for example, enabling data sharing between users. For example, institutions may wish to share medical data (e.g., medical images) for a research purpose such as developing automated algorithms (e.g., a lesion detection algorithm or other machine learning algorithm) or statistical analysis. Due to patient privacy concerns, however, such data sharing is not always permitted. The synthetic dataset 155 described herein addresses this concern because it is (i) representative of real data and (ii) not identical or too closely resembling real data. Thus, the constrained ensemble of GANs 165 generated according to the operations of FIG. 1 can be used to generate the synthetic dataset 155, which is shareable with other users.

At step 110, a request for synthetic data request is received, and in response to the request, synthetic data is generated using one or more randomly-selected members from the constrained ensemble of GANs 165. This disclosure contemplates that the request may come from Institution 'A,' e.g., requesting data from Institution 'B.' In order to share such data, the constrained ensemble of GANs 165 is generated (i.e., trained using Institution 'B's' real data) and used to produce synthetic data, which is shareable. Optionally, Institution 'A' then uses the synthetic data for a research purposes such as training or refining a machine learning algorithm. This disclosure contemplates that Institution 'A's' algorithm may be untrained or previously trained with its own data. In the Example below, the machine learning algorithm is trained with synthetic data to detect BM lesions in medical images. It should be understood that BM lesion detection is provided only as an example research purpose. Research purposes include, but are not limited to, data and statistical analyses. As described herein, the operations of FIG. 1 ensure that synthetic data that is (1) representative, i.e., the synthetic data users can produce comparable results with the original data users, and (2) not closely resembling the originals, i.e., protects patient privacy.

It should be appreciated that the logical operations described herein with respect to the various figures may be implemented (1) as a sequence of computer implemented acts or program modules (i.e., software) running on a computing device (e.g., the computing device described in FIG. 2), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 2:
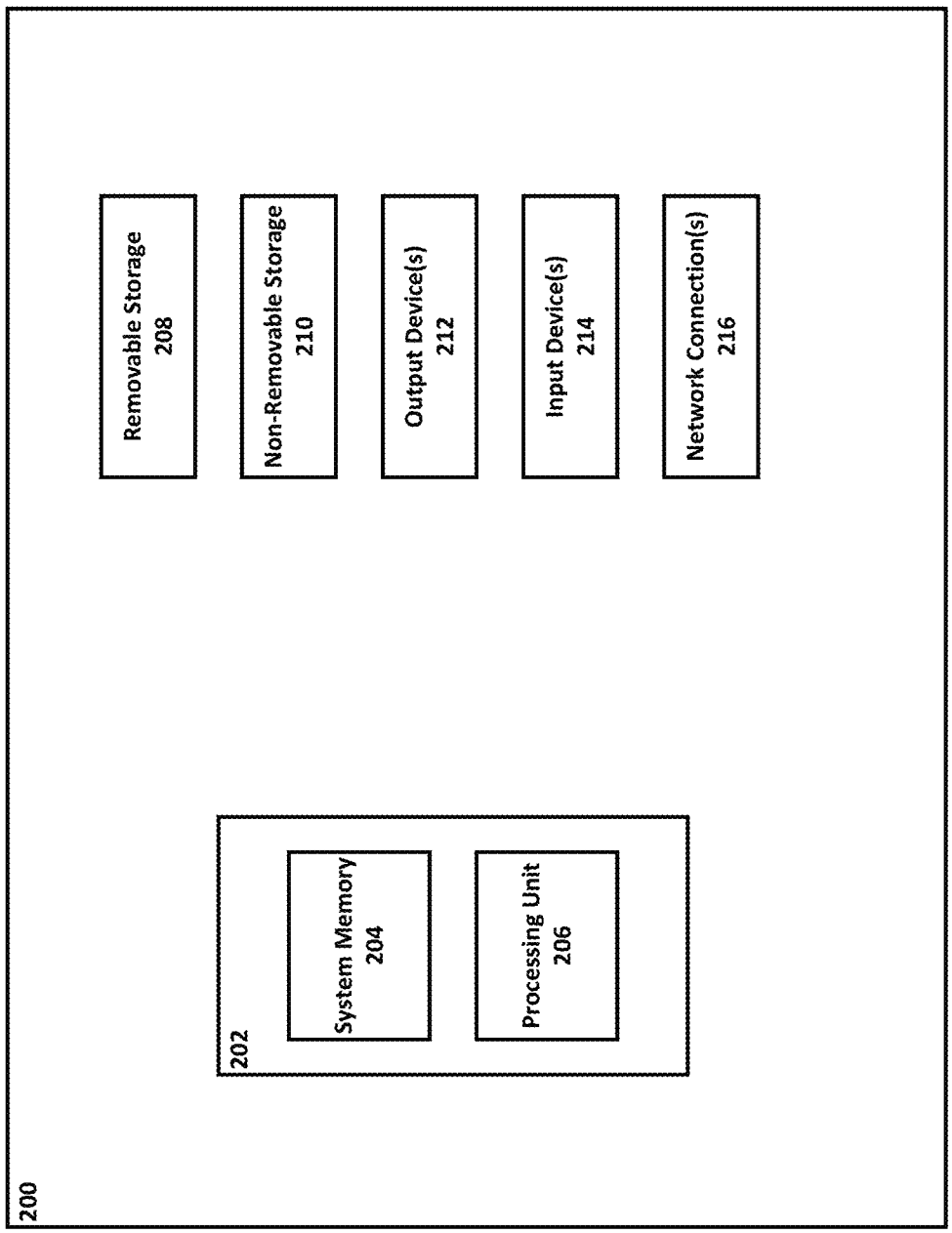
FIG. 2 is an example computing device.

Referring to FIG. 2, an example computing device 200 upon which the methods described herein may be implemented is illustrated. It should be understood that the example computing device 200 is only one example of a suitable computing environment upon which the methods described herein may be implemented. Optionally, the computing device 200 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 200 typically includes at least one processing unit 206 and system memory 204. Depending on the exact configuration and type of computing device, system memory 204 may be volatile (such as random access memory (RAM)), non-volatile (such as read-only memory (ROM), flash memory, etc.), or some combination of the two. This most basic configuration is illustrated in FIG. 2 by dashed line 202. The processing unit 206 may be a standard programmable processor that performs arithmetic and logic operations necessary for operation of the computing device 200. The computing device 200 may also include a bus or other communication mechanism for communicating information among various components of the computing device 200.

Computing device 200 may have additional features/functionality. For example, computing device 200 may include additional storage such as removable storage 208 and non-removable storage 210 including, but not limited to, magnetic or optical disks or tapes. Computing device 200 may also contain network connection(s) 216 that allow the device to communicate with other devices. Computing device 200 may also have input device(s) 214 such as a keyboard, mouse, touch screen, etc. Output device(s) 212 such as a display, speakers, printer, etc. may also be included. The additional devices may be connected to the bus in order to facilitate communication of data among the components of the computing device 200. All these devices are well known in the art and need not be discussed at length here.

The processing unit 206 may be configured to execute program code encoded in tangible, computer-readable media. Tangible, computer-readable media refers to any media that is capable of providing data that causes the computing device 200 (i.e., a machine) to operate in a particular fashion. Various computer-readable media may be utilized to provide instructions to the processing unit 206 for execution. Example tangible, computer-readable media may include, but is not limited to, volatile media, non-volatile media, removable media and non-removable media implemented in any method or technology for storage of information such as computer readable instructions, data structures, program modules or other data. System memory 204, removable storage 208, and non-removable storage 210 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 206 may execute program code stored in the system memory 204. For example, the bus may carry data to the system memory 204, from which the processing unit 206 receives and executes instructions. The data received by the system memory 204 may optionally be stored on the removable storage 208 or the non-removable storage 210 before or after execution by the processing unit 206.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Examples

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The sharing of medical images between institutions, and even inside the same institution, is restricted by various laws and regulations; research projects requiring large datasets may suffer considerably as a result. Corresponding limitations might be addressed by an abundant supply of synthetic data that (1) is representative; the synthetic data users could produce comparable research results as the original data users, and (2) does not closely resemble the originals (i.e., to protect the patient privacy). This example introduces a framework to generate data with the given aspects by advancing the Generative Adversarial Network (GAN) ensembles. First, an adaptive ensemble scaling strategy with the objective of representativeness is defined. Next, a sampled Fréchet Distance-based constraint is described to eliminate poorly converged ensemble member candidates; hence, to ensure a healthy ensemble growth. Finally, a mutual information-based validation metric is embedded into the described framework to confirm the shared synthetic images' visual differences with the originals. The applicability of the solution is demonstrated with a case study for generating 3D brain metastasis (BM) region data from T1-weighted contrast-enhanced MRI studies. A previously published BM detection system was reported to produce 9.12 false-positives at 90% detection sensitivity with the original BM data. By using the synthetic data generated with the proposed framework, the system produced 9.53 false-positives at a similar sensitivity level. Achieving a comparable performance with the sole usage of synthetic data unveils a significant potential to eliminate/reduce imaging data size-related limitations in the near future.

Materials and Methods

Standard GAN and the GAN Ensemble

The GAN is a generative machine learning model used in various applications of computer vision including the image synthesis[21]. A typical GAN is formulated via two neural network (i.e., generator and discriminator) that are optimized in tandem for a minimax problem:

$$\min_G \max_D V(D,G) = E_{x \sim p_{data}}[\log D(x)] + E_{z \sim p_{noise}}[\log(1-D(G(z)))], \quad (1)$$

where (1) D and G are the discriminator and synthetic data generation models, (2) $p_{data}$ is the unknown probability distribution function (PDF) for the real data, and (3) $p_{noise}$ is the PDF for the generator's noise type input (typically uniform or Gaussian). Over the recent years, various GAN formulations modifying the network architectures and/or loss functions were proposed[22]. Depending on the target data type and problem domain, whereas depending on the target data type and problem domain, some formulations are shown to be more applicable than the others[23].

One of the most common problems in GANs is the limited generalizability of their solutions, emerging from the limited representation of information. State-of-the-art GAN formulations such as [40]-[42], and multiple hypothesis-based techniques (utilizing parts or all of GAN architecture) including the ensembles[19, 43], generator-mixture[44], and multi-agents[45] were proposed to tackle/reduce the problem. While our solution is agnostic and leaves the selection of the GAN type as a design choice of the researcher, it introduces an ensemble growth strategy to provide representative synthetic datasets.

The ensemble of GANs is an algorithm, where multiple GAN models (regardless of the GAN formulation) are trained using a single training dataset, then the synthetic data is generated via a randomly picked ensemble member for each synthetic data request[19,24]. It was shown that the ensemble of GANs outperforms a single GAN with respect to the information coverage, computed using Wilcoxon signed-rank test[25], and a manifold projection distance metric defined in Y. Wang et al. [19]. The results outline the common traits of ensembles; (1) the avoidance of overfitting due to multiple hypotheses covered by its components, (2) reduced chance of stagnating at local optima as each component runs its optimization process individually, and (3) improved representation of the optimal hypothesis since the combination of different models commonly expands the solution search space[26, 27]. The approach was further customized by (1) integrating ensemble members with similar network initializations to speed up the training process (self-ensemble of GANs), and (2) using discriminator feedbacks to detect/improve GANs with limited information coverage (the cascade of GANs) [19].

Objective Oriented Ensemble Formulation

Ensemble Growth Strategy

The commonly used optimization goals for the generative algorithms, such as (1) minimizing information divergence from the original data [28] (e.g., computed via Jensen-Shannon, Kullback-Leibler), (2) generating subjectively highly realistic outputs (e.g., Visual Turing Test [29]), or (3) information coverage optimization (e.g., Wilcoxon signed-rank test), do not necessarily lead to the generation of research-wise representative data [13]: The representativeness in this context is the ability to produce comparable research results using the synthetic data as with the original data. The complex metric of representativeness would require the execution of a complete validation study with an external algorithm for a new set of data at each optimization step; thus, it is not part of any generative approach, including the ensemble of GANs. In this example, an adaptive growth strategy for GAN ensembles is used to address this objective by introducing an additional computational overhead as:

The baseline performance using an algorithm executed on the original data is defined as, $$\vartheta_0 = P(A, D_o), \quad (2)$$

where (1) A is the algorithm, referred to as the validation model (e.g., cardiac segmentation, liver tumor detection, etc.), (2) $D_o$ is the original data set, (3) P is the evaluation methodology (e.g., N-fold cross-validation, bootstrapping, etc.), and (4) $\vartheta_o$ is the baseline performance value (e.g., Dice score, the area under the receiver operating characteristic curve, etc.).

Temporary ensemble performance is described as $$\vartheta_i = P(A, D_i = E_i(D_o)) \text{ with } |D_i| = |D_o| \quad (3)$$

$$\forall d \in D_i E_i \xleftarrow{R} e \text{ and } d = e(z \sim p_{noise}) \quad (4)$$

where (1) $\vartheta_i$ is temporary ensemble performance, (2) $D_1 = E_i(D_o)$ is the data set generated by the ensemble's ith iteration with the same size as the original data, and (3) each data d in $D_i$ is generated by a random member of $E_i$ called e; receiving noise type input z.

The growth of the ensemble can be halted when the ensemble performance becomes comparable with the baseline performance; $|\vartheta_o - \vartheta_i| \leq \varepsilon$, where $\varepsilon$ gives the acceptable performance gap threshold. Divergence of the performance with the growth of the ensemble might indicate (1) improper GAN formulation selection or its parametrization, and/or (2) inadequate original training data; therefore, they need to be reconsidered.

Ensemble Member Constraint

While the ensemble growth strategy described above is intuitive, it causes a significant computational overhead due to the iterative calculation of the temporary ensemble performance. The issue can be partially addressed by computing the performance metric periodically (e.g., after every ten additional GAN members) instead of each iteration. However, the number of iterations could still be high depending on the individual performances of ensemble members [27]: Diverged or mode-collapsed members would fail to produce plausible synthetic samples making the ensemble overgrown and inefficient.

The Fréchet Inception Distance (FID) [30] was introduced for evaluating a GAN performance; the Fréchet distance between the original and synthetic data's lower-dimensional manifold representations extracted from the Inception model [31] is used for the model assessment. The FID allows the robust detection of mode-collapsed and diverged GAN models [32]. However, as the Inception network is trained for two-dimensional color images of random scenes in ImageNet [33], the metric cannot be used for the evaluation of models that produce any-dimensional (e.g., 3D, 3D+T, etc.) medical imaging data. Accordingly, a sampled Fréchet Distance (SFD) that is mostly identical with the FID whereas differing with respect to its inputs is used as;

$$f^2((m_r, C_r), (m_g, C_g)) = \|m_r - m_g\|_2^2 + Tr(C_r + C_g - 2 \text{ Re}(C_r C_g)^{1/2}), \quad (5)$$

where (1) ($m_r$, $C_r$) and ($m_g$, $C_g$) give original and generated data's sampled mean and covariance tuples respectively, and (2) Re gives the real components of its input. Unlike the FID (which uses lower-dimensional representation extracted from a pre-trained Inception model), the metric uses the flattened vector representations for the down-sampled original and synthetic data with the assumption of these having multivariate Gaussian distributions. Hence, it can be used for evaluating any generative model by verifying $f^2 < \omega$, with $\omega$ giving the maximum allowed SFD between synthetic and original samples.

Visual Resemblance Test

The shared synthetic data is strictly forbidden to be identical with the original data for protecting the patients' privacy. Therefore, each synthetic data sample needs to be compared with the original data set. While voxel-wise image comparison (e.g., mean square difference, etc.) might be adequate to eliminate synthetic samples having high visual similarity with the originals, it would not necessarily detect statistically dependent samples (e.g., intensity inversed version of an image, etc.). Thus, a mutual information based metric defined for each synthetic sample is used as:

$$I_{max} = \text{argmax}_{n \in \{1, N\}}(H(T(d_g)) - H(T(d_g) | d_{o,n})), \text{ and}$$
$$I_{max} \leq \varphi, \quad (6)$$

where (1) N is the number of original training samples (i.e., $|D_o|$), (2) $d_g$ is the synthetic sample, (3) $d_{o,n}$ is the nth original sample, (4) T ($d_g$) is the geometrically transformed synthetic sample (i.e., translation, rotation), (4) $H(T(d_g))$ is the Shannon entropy of the synthetic sample, and (5) $H(T(d_g)|d_{o,n})$ is the conditional entropy. Accordingly, $I_{max}$ gives the maximum mutual information (MI) between the synthetic sample and all real samples, and $\varphi$ is the maximum acceptable MI; a synthetic sample with $I_{max} > \varphi$ is not shared due to its high similarity with an original sample(s). This stage may also be described as finding an optimal (i.e., based on MI) rigid transformation between the synthetic sample and all real samples, then eliminating the synthetic one if it returns a high MI.

The Framework

The described ensemble growth strategy, member constrain and visual resemblance test can be integrated into a framework for the synthetic data generation:

(1)—The baseline performance ($\vartheta_o$) is computed using a validation model (A) on the original data set ($D_o$).

(2)—A proper GAN formulation is chosen for the target data type. The ensemble is grown with the selected type of GANs to produce synthetic samples having SFD with the originals less than a threshold ($\omega$).

(3) Step-2 is repeated iteratively until the baseline performance metric is achieved with an acceptable performance gap (E) using the ensemble generated data. If the temporary performance ($\vartheta_i$) diverges, then the GAN type and $\omega$ are needed to be reconsidered.

(4) The matured ensemble's output is validated using the visual resemblance test; the synthetic samples having low MI($\leq \varphi$) with the original data set are shared.

Case Study: Brain Metastatic Region Data Generation

Problem Definition

The BMs are the most common form of brain cancer, where 20 to 40% of cancer cases have this complication. The metastatic lesions can vary significantly in size and appearance; early forms of the disease present as punctate foci measuring as small as 1 mm in diameter. In E. Dikici et al. [20], an approach for the detection of particularly small BMs, with diameters of ≤15 mm, for the gadolinium-enhanced T1-weighted 3D MRI is described. Briefly, the method first determines all BM candidates using an information-theory based algorithm. Next, the candidates are processed using a parametrized deep-neural-network formulation (CropNet) to give the final BM detections; the CropNet learns the statistical representation of a BM from isometric metastatic region volumes with 16 mm edge length and differentiates it from any other similar size volumetric region extracted from the brain image. The approach was validated using five-fold-cross-validation (CV) on 217 datasets acquired from 158 patients including 932 BMs in total. It was reported to produce 9.12 average number of false-positive BMs for 90% detection sensitivity.

In the detection study, while negative samples were abundant (random volumetric extractions from brain images), BM regions were limited (932 3D volumes with 16 mm edges). Accordingly, the purpose of this case study is to generate synthetic BM regions using the constrained GAN ensemble framework. The ensemble growth objective is set as the detection system trained with the synthetic samples produces a comparable number of false-positives for the given sensitivity level using the same dataset used in Dikici et al. [20]:

$A$: The BM detection algorithm, (7)

Figure 4B:
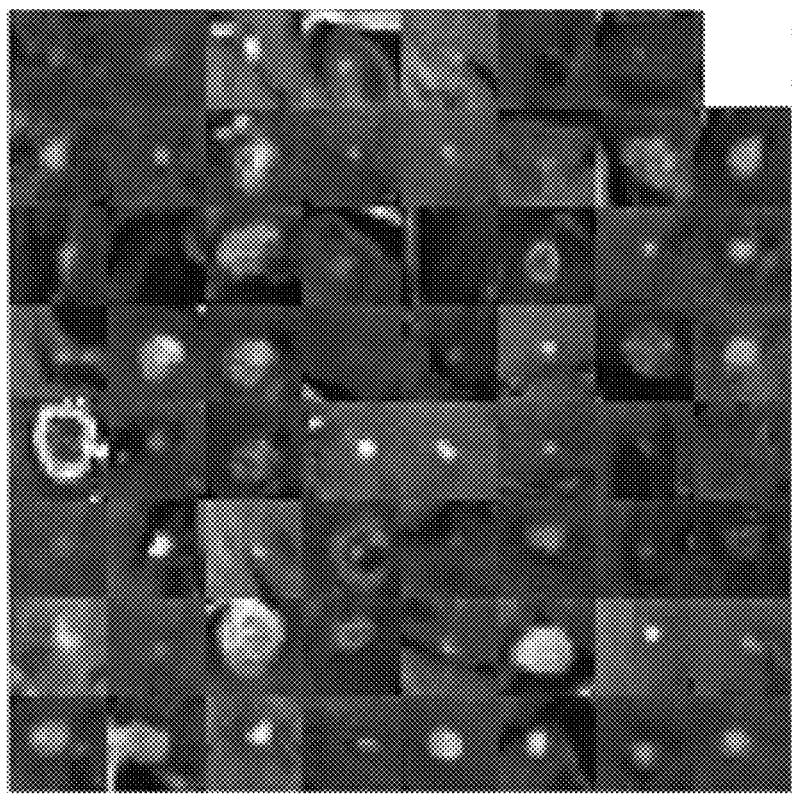
FIGS. 4A-4B illustrates mosaic of mid-axial slices of (FIG. 4A) real and (FIG. 4B) DCGAN-generated synthetic BM region volumes.
Figure 4A:
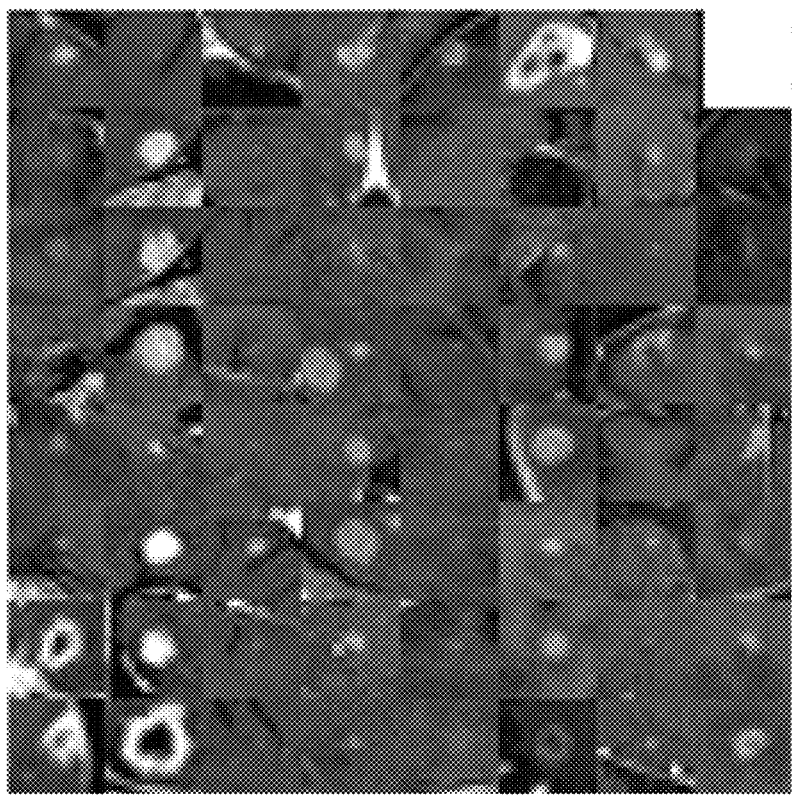

$\vartheta_o$: 9.12 false positives at 90% detection sensitivity,
$D_o$: 932 BM region volumes from 217 datasets
$P$: 5-fold CV Framework Setup and Parameters
GAN Setup In this case study, deep convolutional GANs (DCGANs) [34] were utilized as the ensemble members for generating 3D brain metastatic regions segmented from T1-weighted contrast-enhanced MRI. The formulation was chosen as it has been successfully deployed for medical image synthesis in numerous previous studies [12, 15, 35, 36]. The DCGAN was originally designed for 2D images; hence, we adapted it for 3D by (1) modifying the generator (G) to produce 16×16×16 volumes that represent cropped BM regions, and (2) modifying the discriminator (D) to classify volumetric input type. The implemented DCGAN architecture is shown in FIGS. 3A-3B, and some examples for the real (FIG. 4A) and DCGAN generated synthetic BM samples (FIG. 4B) are shown in FIGS. 4A-4B.

Data Preprocessing

All datasets were resampled to have isotropic (1 mm×1 mm×1 mm) voxels. The voxel values were normalized to [0, 1] range, where the maximum and minimum intensity voxels for each dataset had the normalized values of 1 and 0 respectively.

Parameters

The DCGAN type ensemble member candidates were trained where, (1) binary-cross entropy type loss was used for the discriminator and generator networks (as in A. Radford et al. [34]), (2) Adam algorithm [37] was used for the network optimization, (3) learning rates for the discriminator and generator networks were set as 0.00005 and 0.0003 respectively, (4) the dropout rate of the discriminator network was 0.15, (5) leaky ReLU units' alpha values were 0.1 for both of the networks, and (6) 1500 training epochs were executed with batches each consisting of 8 pairs of positive and negative samples.

Figure 5A:
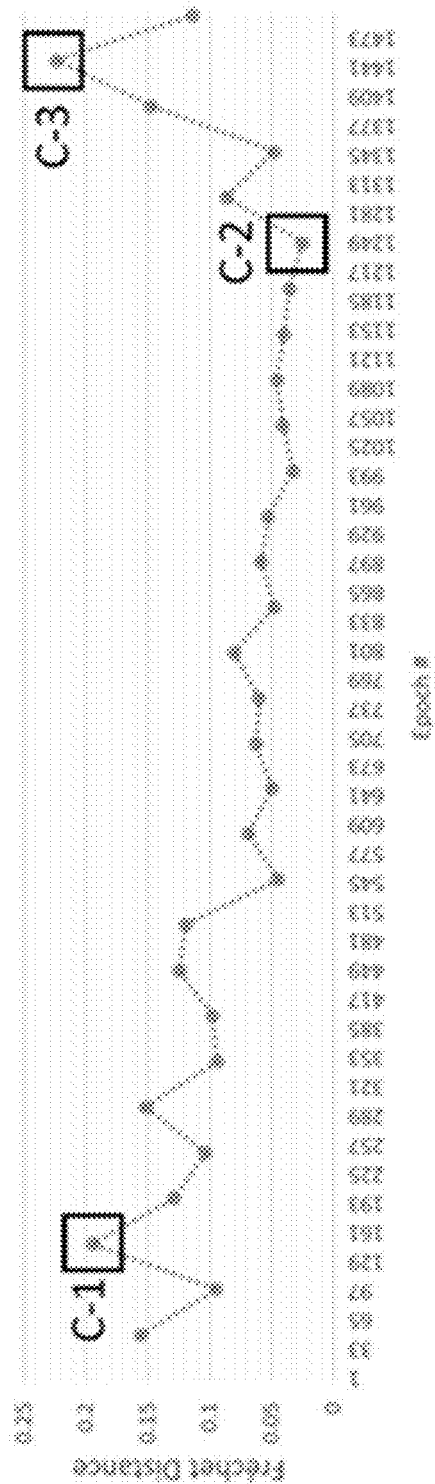
FIGS. 5A-5C illustrates sampled Fréchet Distance (SFD) for the DCGAN validation.
Figure 5B:
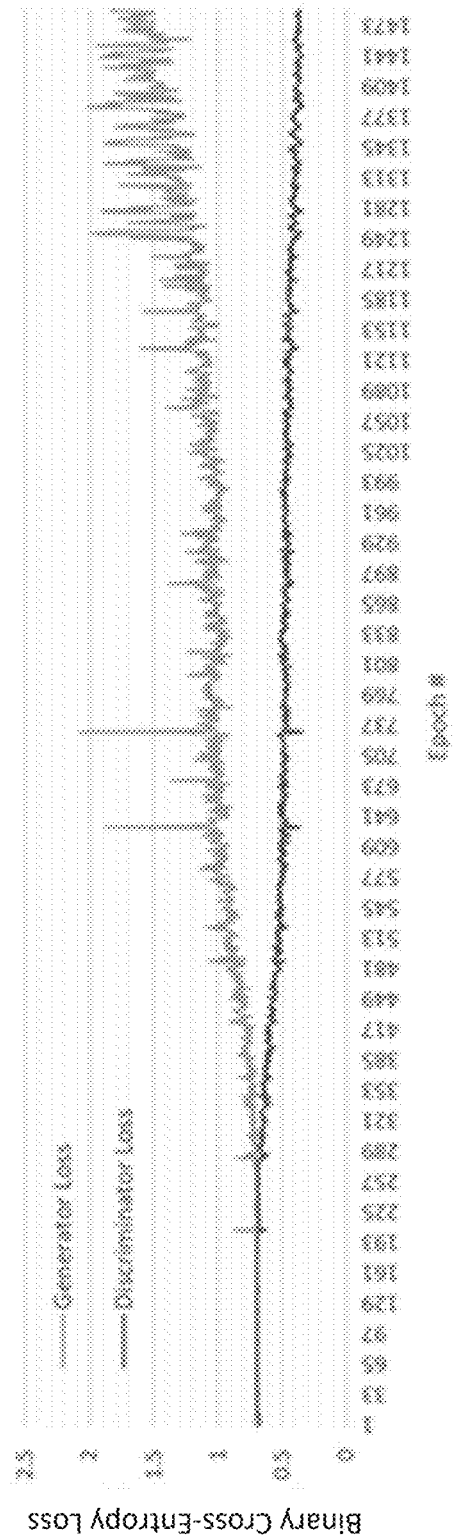
Figure 5C:
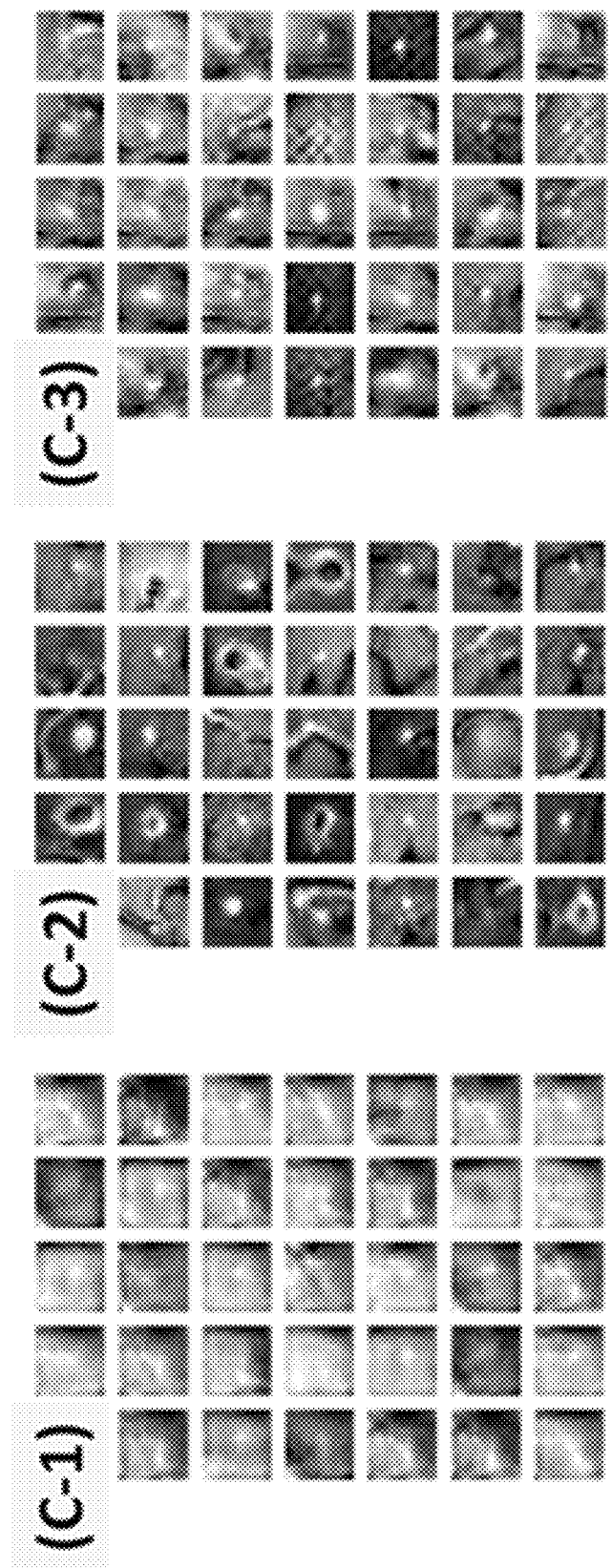
Figures 6A, 6B:
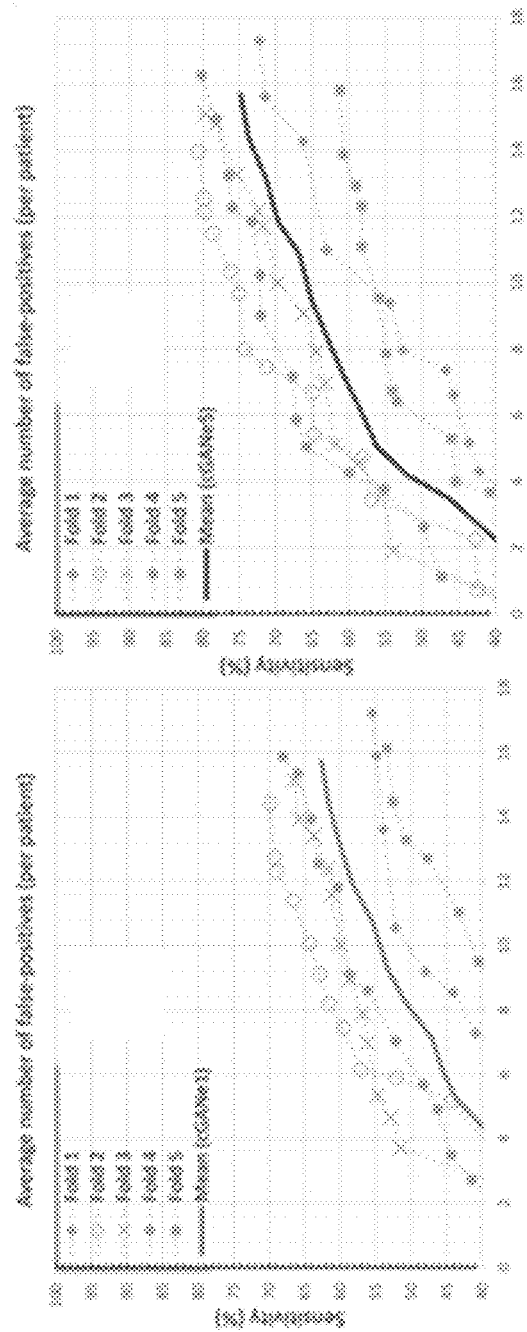
FIGS. 6A-6H are graphs of AFP in relation to the detection sensitivity for the (FIG. 6A) cGANe1, (FIG. 6B) cGANe5, (FIG. 6C) cGANe10, (FIG. 6D) cGANe20, (FIG. 6E) cGANe30, (FIG. 6F) cGANe40, and (FIG. 6G) baseline.
Figures 6C, 6D:
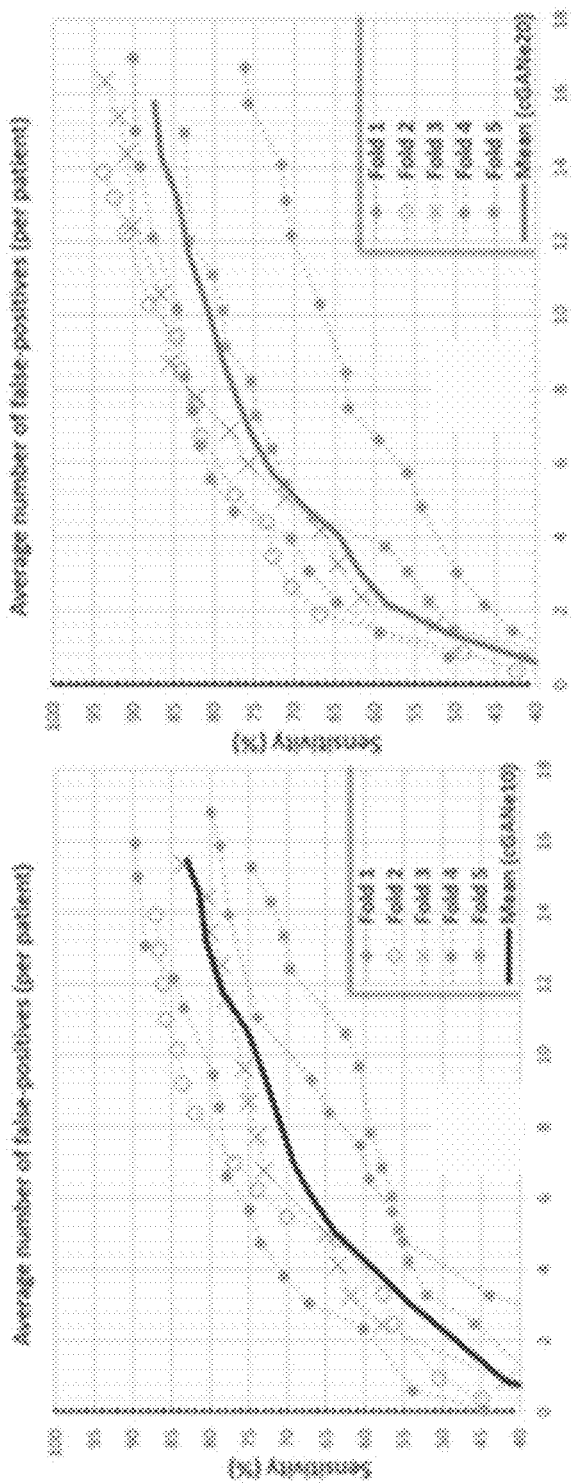
Figures 6E, 6F:
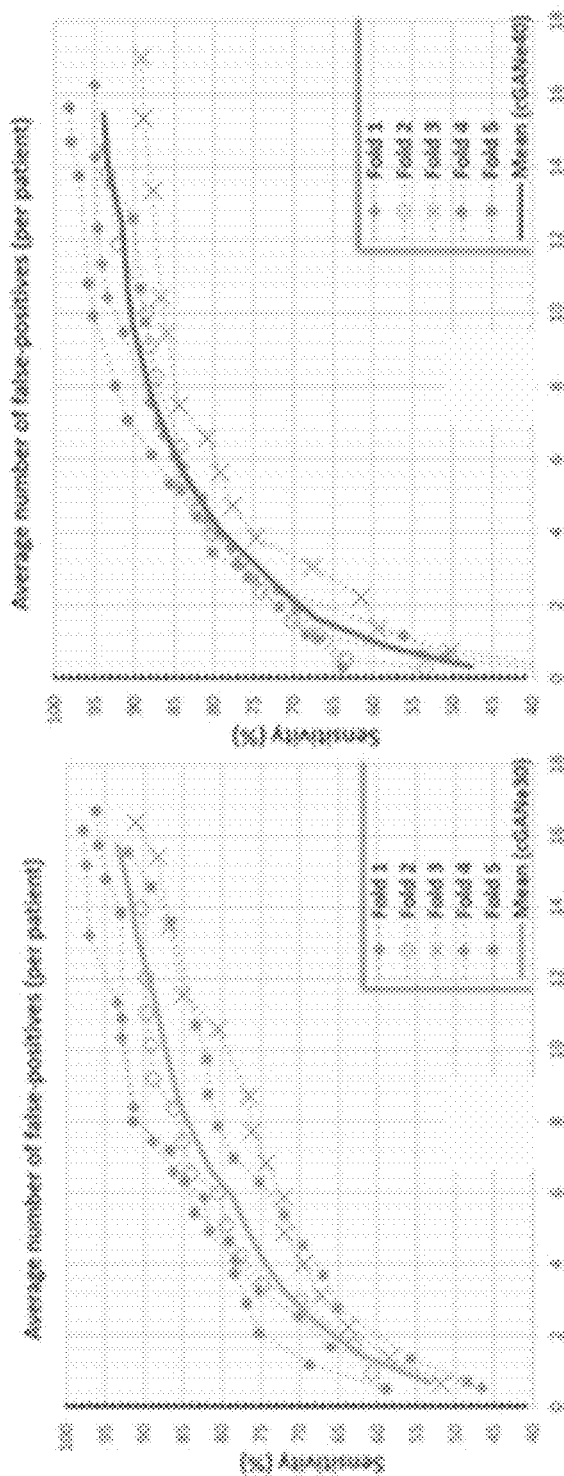
Figure 6H:
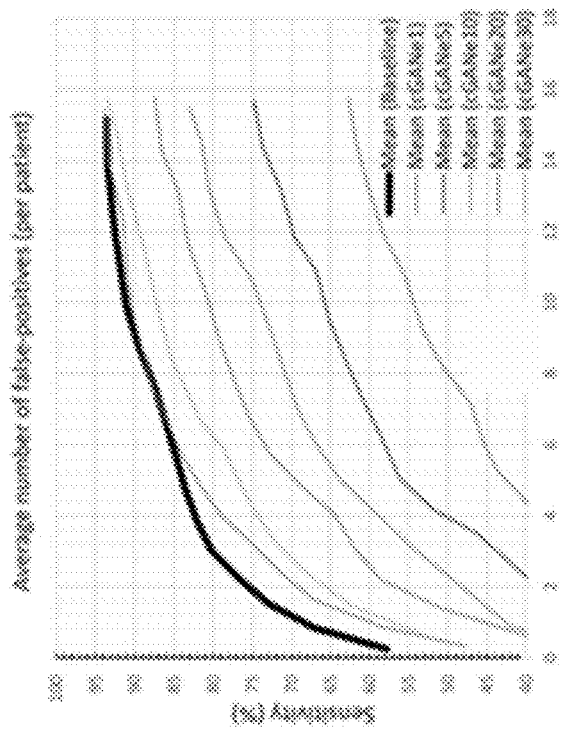
Figure 6G:
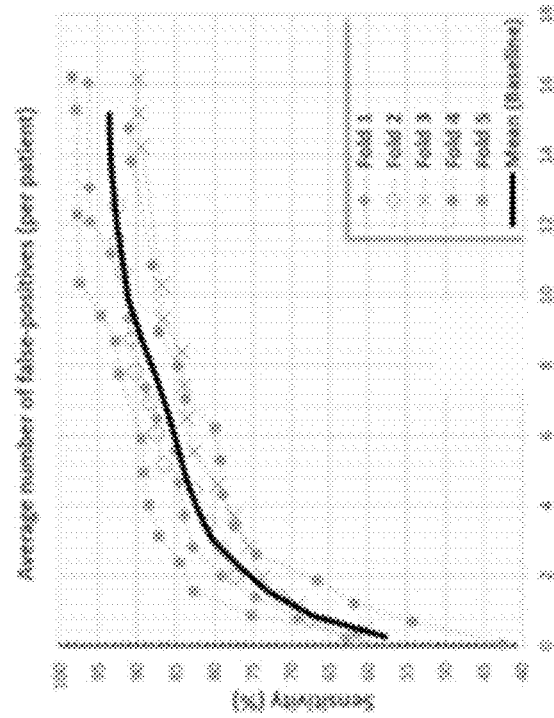

For a given member candidate, to compute the mean and covariance estimates of its synthetic data ($m_g$, $C_g$), 2000 synthetic samples were generated by its generator in every 50 epochs of the training, whereas the real data statistics ($m_r$, $C_r$) were computed using the original data prior to the training. The member candidates that generated synthetic data having SFD of less than ω=0.04 were added into the ensemble (see FIGS. 5A-5C).

The acceptable performance criteria for the BM detection algorithm, trained using the synthetic data generated by the ensemble, was set as 10.12 false positives at 90 percent BM-detection sensitivity: Acceptable performance gap (E) was an additional false-positive with respect to the baseline performance $\vartheta_o$.

Identification of a patient based on a BM region volume is not likely as the area spans a very limited area. However, to have a glance of the visual resemblance test, the generated sharable samples were allowed to have MI with the original data less than φ=0.5, where the transformation domain (T) kept empty due to the simplicity of the target data.

Results
Validation Study

The performance of the BM detection algorithm using the synthetic data, generated by the proposed framework, was validated using a five-fold CV: 217 datasets acquired from 158 patients were patient-wise divided into five folds of 31, 31, 32, 32 and 32 patients respectively. For each fold, (1) the other four folds were used for generating the constrained GAN ensemble (cGANe), (2) synthetic data produced by the ensemble was used for training the BM detection algorithm, and (3) and the original data in the selected fold was used for the testing. The average number of false positives (AFP) with respect to the system's detection sensitivity is represented for the ensembles with the sizes of 1, 5, 10, 20, 30, and 40 DCGAN models (i.e., cGANe1, cGANe5, cGANe10, cGANe20, cGANe30, and cGANe40) in FIGS. 6A-6H. The information is summarized for the 75, 80, 85, and 90 percent detection sensitivities in Table 1 (FIG. 9).

Figures 7A, 7B:
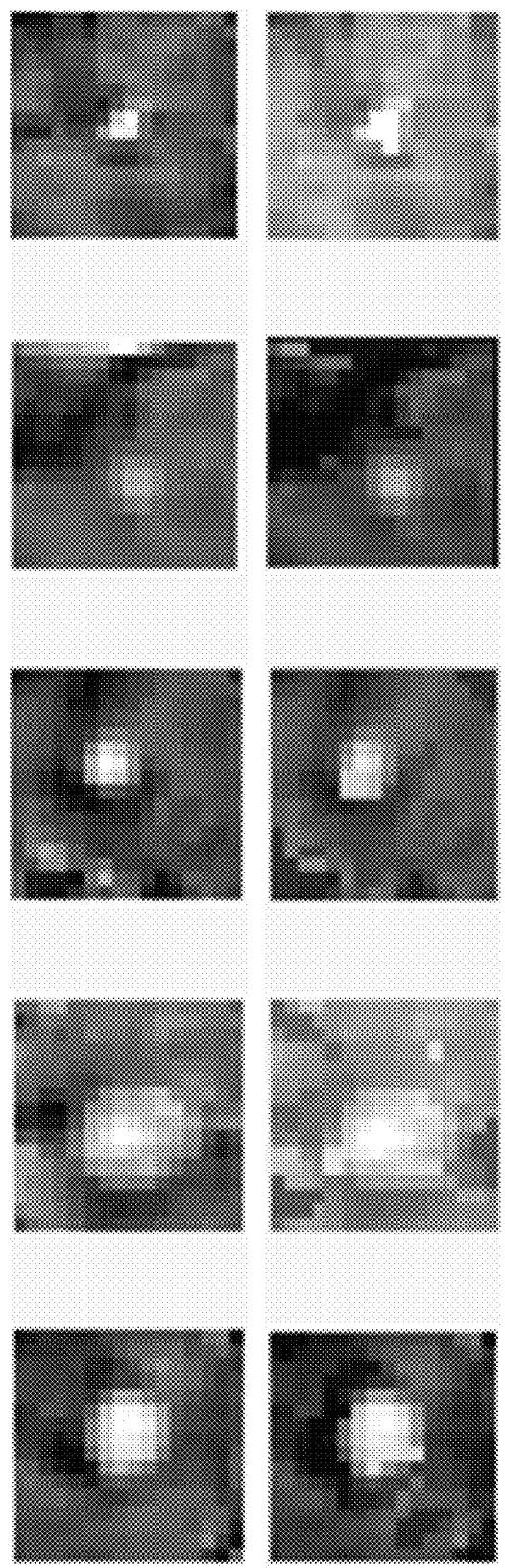
FIGS. 7A-7B illustrates mid-axial slices of some originals (FIG. 7A) and synthetic samples that were eliminated due to high resemblance to those (FIG. 7B).

The visual resemblance test eliminated 5.7% of the 2000 synthetic samples. In FIGS. 7A-7B, some examples for these eliminated synthetic images and the corresponding original images are shown.

The proposed solution was implemented using the Python programming language (v3.6.8). The neural network implementations were performed using Keras library (v2.1.6-tf) with TensorFlow (v1.12.0) backend. The training of each DCGAN was done in ~1.25 hours, where a DCGAN satisfying the SFD constraint was generated in ~2.15 hours on average. Thus, growing a given cGANe with ten additional DCGANs took ~21.5 hours on average. The training of the validation model for each fold took ~3.5 hours. The network training was performed using four parallel processing NVIDIA 1080ti graphics cards, having 11 GB RAM each.

Ablation Study: Unconstrained Ensembles

To quantify the impact SFD based ensemble growth constraint, the validation study for ensembles that grew without it (GANe) was performed; each newly trained DCGAN was added into the ensemble without verifying their output's statistical distribution via SFD. The summary for the results of this experiment is provided in Table 2 (FIG. 10).

Visualizing the Ensemble Information Coverage

Figure 8:
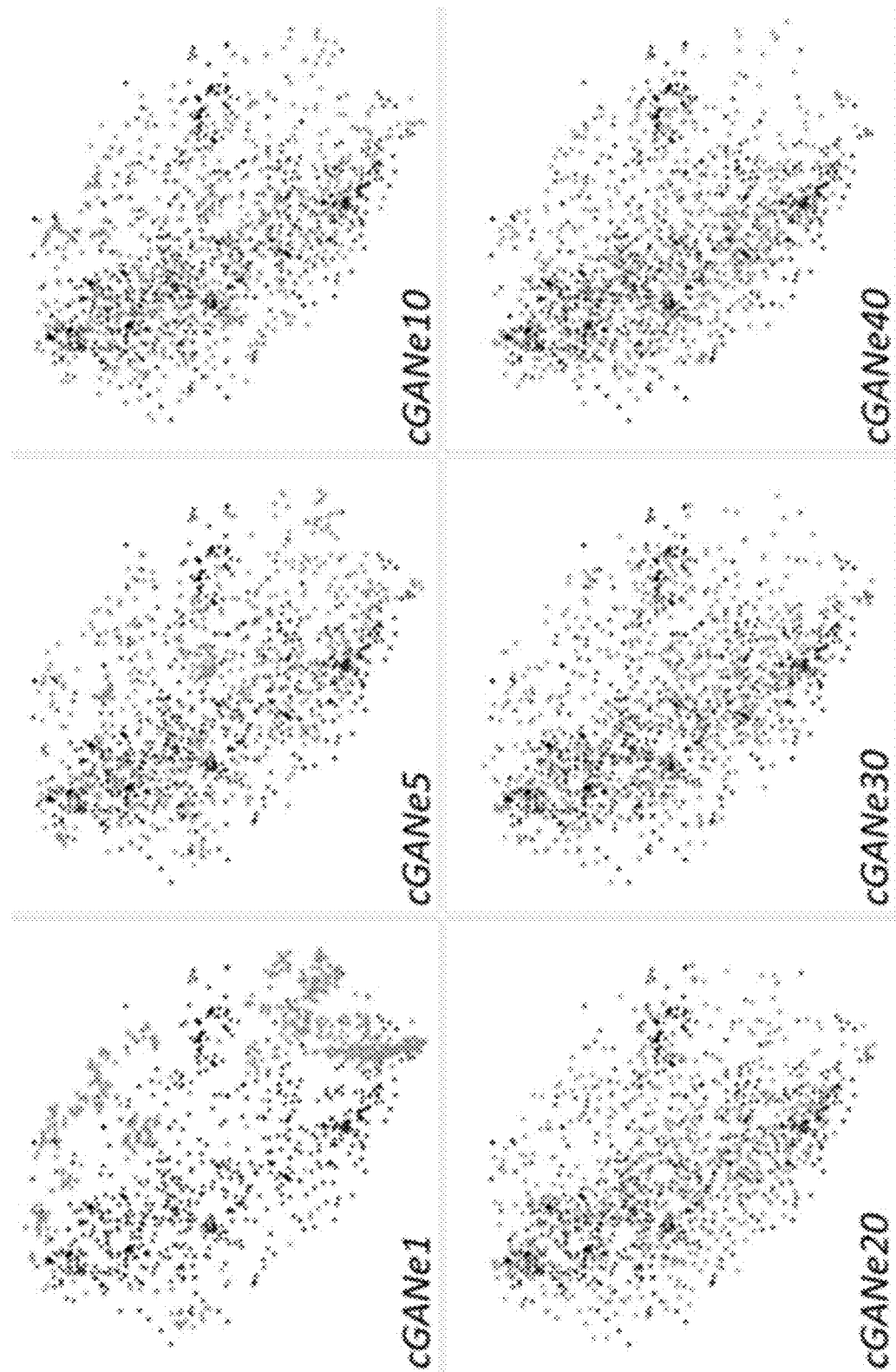
FIG. 8 are t-SNE representations for real (black) and cGANe generated (gray) data samples.

As described previously, a potential problem with the usage of a single GAN is the partial representation of the real data PDF. The issue and the validity of our solution was further illustrated by performing a low dimensional data embedding analysis (see FIG. 8): The real data (i.e., all 932

BMs) and the matching number of cGANe generated synthetic samples were visualized via two-dimensional embeddings, generated by (1) reducing the flattened 4096-dimensional volumetric data into 80-dimensional data using principal component analysis (PCA) [38], explaining ~84.5 percent of the data variance, and (2) embedding these 80-dimensional representations into two dimensions using t-Distributed Stochastic Neighbor Embedding (t-SNE) [39]. (The mapping of very high dimensional data into highly representative lower-dimensional data prior to t-SNE was suggested in L. van der Maaten et al. [39]). As shown in the cGANe1 plot, the usage of a single constrained DCGAN caused the lower-dimensional mappings to accumulate in regions that do not align well with the original data. The misrepresentation declined with the cGANe scale, where the cGAN(e≥10) plots have better real and synthetic data mixtures; explaining the improved validation model performances of cGANe settings with higher numbers of components.

Data Scale and Computational Cost Relationship

Figure 12:
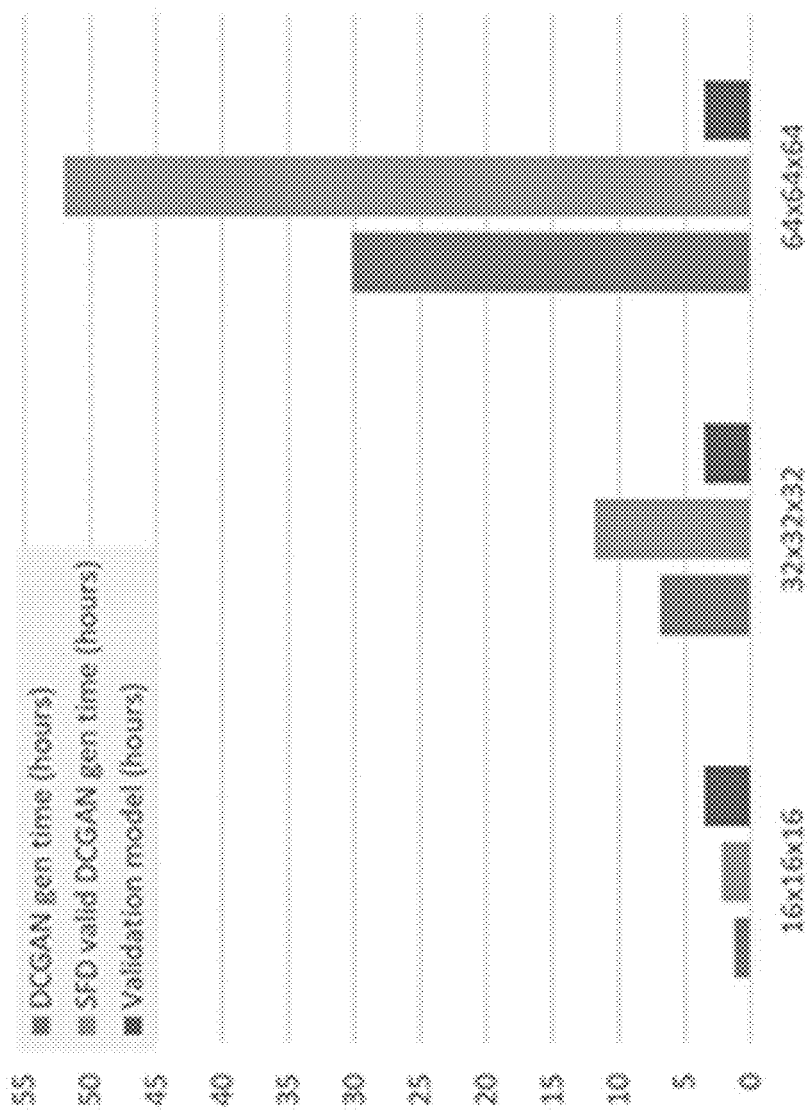
FIG. 12 is a bar graph illustrating estimated DCGAN, SFD valid DCGAN, and validation model generation times for different resolutions.

The computational cost of the introduced framework depends on various factors, including the GAN type, validation model, and convergence of an ensemble. A hypothetical study was performed to estimate the relationship between the target image resolution and the cGANe computation time: (1) DCGAN training times for 32×32×32 and 64×64×64 volumes were computed by upscaling the network shown in FIGS. 3A-3B with the same contraction/expansion strategy and using the up-scaled version of the original data, and (2) SFD constraint satisfaction rate and validation model computation times were assumed to be constant values inferred from the original study (see FIG. 12). Based on these, it is expected that the training time for a cGANe ensemble with ten members is ~115 hours for 32×32×32 volumes, and it is ~523 hours for 64×64×64 volumes respectively (using the same hardware specified in the "Validation study"). Please note that for these higher image resolutions, DCGAN may lead to imaging artifacts and lower sample variety [48] (causing larger-scale ensembles); hence, a different GAN formulation might be preferable.

DISCUSSION AND CONCLUSION

The validation study showed that the synthetic data generated by a constrained ensemble of 40 DCGANs (cGANe40) can be used for training a BM-detection model successfully: The model trained using the dataset generated by cGANe40 produced 9.53 false-positives for 90 percent detection sensitivity. The result is comparable with the 9.12 false-positives for the same sensitivity level produced using the original data for the model training (see FIGS. 6A-6F and FIG. 9, Table 1). Accordingly, the ensemble can be utilized for producing positive synthetic data samples for client sites intending to (1) reproduce the results with the same BM-detection model, or (2) use it for performing another research with this specific data type (i.e., volumetric BM region data for T1-weighted contrast-enhanced MRI examinations).

The ablation study was performed to present the impact of SFD based ensemble member constraint on final performance. As shown in FIG. 10, Table 2, the elimination of this constraint led to a BM-detection performance that is significantly worse than the original performance; using the data produced by an unconstrained ensemble with 40 members (GANe40) caused ~16 false-positives for 90 percent detection sensitivity.

The visual resemblance test was shown to eliminate synthetic samples (see FIGS. 7A-7B) that closely resemble the originals. The technique can be further validated in a future study for modalities in which the patient could be identified from the medical images (i.e., full head CT). This may also require the geometric transformation component of Equation-6 (i.e., T(.)) to be adapted for non-rigid transformations. The visual resemblance test may also be re-formulated to utilize (1) image feature-based comparisons (i.e., computed via volumetric interest point detectors[46]), or (2) a dedicated image similarity detection DNN such as Siamese networks[47].

The visualization of the low dimensional data embeddings provided a glimpse of enhanced information mode coverage with the ensemble scaling, whereas the study primarily focused on the representativeness of the synthetic data concerning the reproduction of research results. The representativeness is correlated with the coverage of parts of the information domain in this context (e.g., synthetic data for BM should contain visually correct tumor(s), while the visual correctness of surroundings may be less critical for a validation model to perform).

The framework currently holds various parameters (e.g., the GAN type, acceptable performance gap, visual resemblance test threshold, etc.), which were set empirically for the given case study. Future studies may benefit from the provided values as a starting point; yet, they need to be determined for each novel synthetic data generation application.

As mentioned previously, GANs were used for data augmentation purposes in various medical imaging applications[12-16]. The introduced approach may also be suitable for the data augmentation tasks since it produces synthetic samples that are validated for their representativeness. As an application example, the BM detection framework could be reformulated to use cGANe produced-samples in addition to original data during its training stage; hence, replacing its original data augmentation pipeline (consisting of random elastic deformation, gamma correction, flip and rotation operations[20]) with the cGANe.

A limitation of the introduced framework is its computational efficiency. For the given case study, a given constrained ensemble grew with ten additional members in ~21.5 hours; hence, the cGANe40 computation took ~86 hours (for a single fold). After the completion of the constrained ensemble, the synthetic data then can be generated in magnitudes of thousands in a few seconds (i.e., 2000 synthetic volumes are generated in ~14 seconds).

This example introduced the constrained ensemble of GANs, formulated to generate synthetic datasets that are research worthy and do not contain samples closely resembling the original data. The solution includes the (1) objective oriented ensemble growth strategy, (2) SFD constraint for ensemble members, and (3) visual resemblance metric. This example presented the applicability of the proposed solution by generating BM region volumes, where replacing the original data with the synthetic ones during the model training led to acceptable performance during the model testing.

Medical image processing has evolved over the last decade in the direction of being heavily data-driven. Accordingly, the amount of data utilized during the development is a determining factor for the performances of deployed models. However, the sharing of medical data between the institutions, and even between the departments of the same institution, is limited due to regulations and laws. This example presents a framework to address this issue via synthetic medical data, vetted to enable reproducible research results and ensure patient privacy. A redundant supply of such synthetic medical datasets, produced for a variety of modalities and medical conditions, could potentially foster more collaboration among organizations and expedite scientific discoveries in this field.

REFERENCES

[1]. W. Liu et al., "A survey of deep neural network architectures and their applications," Neurocomputing 234, 11-26, Elsevier (2017) [doi:10.1016/j.neucom.2016.12.038].

[2]. G. Litjens et al., "A Survey on Deep Learning in Medical Image Analysis," Med. Image Anal. 42 (2017) [doi:10.1016/j.media.2017.07.005].

[3]. D. Shen, G. Wu, and H.-I. Suk, "Deep learning in medical image analysis," Annu. Rev. Biomed. Eng. 19, 221-248, Annual Reviews (2017) [doi:doi:10.1146/annurev-bioeng-071516-044442].

[4]. V. Sze et al., "Efficient processing of deep neural networks: A tutorial and survey," Proc. IEEE 105(12), 2295-2329, Ieee (2017) [doi:10.1109/JPROC.2017.2761740].

[5]. S. Nass, L. Levit, and L. Gostin, Beyond the HIPAA Privacy Rule: Enhancing Privacy, Improving Health Through Research, in Beyond the HIPAA Privacy Rule: Enhancing Privacy, Improving Health Through Research, The National Academies Press, Washington, DC (2009) [doi:10.17226/12458].

[6]. R. C. Petersen et al., "Alzheimer's disease neuroimaging initiative (ADNI): clinical characterization," Neurology 74(3), 201-209, Lippincott Williams and Wilkins (2010) [doi:10.1212/WNL.0b013e3181cb3e25].

[7]. L. Oakden-Rayner, "Exploring Large-scale Public Medical Image Datasets," Acad. Radiol. 27(1), 106-112, Elsevier (2019) [doi:10.1016/j.acra.2019.10.006].

[8]. K. Clark et al., "The Cancer Imaging Archive (TCIA): maintaining and operating a public information repository," J. Digit. Imaging 26(6), 1045-1057, Springer (2013) [doi:10.1007/s10278-013-9622-7].

[9]. P. Dluhos et al., "Multi-center Machine Learning in Imaging Psychiatry: A Meta-Model Approach," Neuroimage 155 (2017) [doi:10.1016/j.neuroimage.2017.03.027].

[10]. I. Goodfellow et al., "Generative Adversarial Networks," Adv. Neural Inf. Process. Syst. 3 (2014).

[11]. E. Tzeng et al., "Adversarial discriminative domain adaptation," in Proceedings of the IEEE Conference on Computer Vision and Pattern Recognition, pp. 7167-7176 (2017) [doi:10.1109/CVPR.2017.316].

[12]. M. Frid-Adar et al., "GAN-based Synthetic Medical Image Augmentation for increased CNN Performance in Liver Lesion Classification," Neurocomputing (2018) [doi:10.1016/j.neucom.2018.09.013].

[13]. C. Bowles et al., "GAN augmentation: augmenting training data using generative adversarial networks," arXiv Prepr. arXiv1810.10863 (2018).

[14]. C. Han et al., "Combining Noise-to-Image and Image-to-Image GANs: Brain MR Image Augmentation for Tumor Detection," IEEE Access 7, 1 (2019) [doi:10.1109/ACCESS.2019.2947606].

[15]. A. Madani et al., "Semi-supervised learning with generative adversarial networks for chest X-ray classification with ability of data domain adaptation," 2018, 1038-1042 [doi:10.1109/ISBI.2018.8363749].

[16]. H. Salehinejad et al., "Generalization of Deep Neural Networks for Chest Pathology Classification in X-Rays Using Generative Adversarial Networks," 2018 [doi:10.1109/ICASSP.2018.8461430].

[17]. R. Arandjelović and A. Zisserman, "Object discovery with a copy-pasting gan," arXiv Prepr. arXiv1905.11369 (2019).

[18]. D. Lee et al., "Context-Aware Synthesis and Placement of Object Instances," in Proceedings of the 32nd International Conference on Neural Information Processing Systems, pp. 10414-10424, Curran Associates Inc., Red Hook, NY, USA (2018) [doi:doi:10.5555/3327546.3327701].

[19]. Y. Wang, L. Zhang, and J. Van De Weijer, "Ensembles of generative adversarial networks," arXiv Prepr. arXiv1612.00991 (2016).

[20]. E. Dikici et al., "Automated Brain Metastases Detection Framework for T1-Weighted Contrast-Enhanced 3D MRI," IEEE J. Biomed. Heal. Informatics, 1 (2020) [doi:10.1109/JBHI.2020.2982103].

[21]. X. Wu, K. Xu, and P. Hall, "A survey of image synthesis and editing with generative adversarial networks," Tsinghua Sci. Technol. 22(6), 660-674 (2017) [doi:10.23919/TST.2017.8195348].

[22]. Z. Pan et al., "Recent Progress on Generative Adversarial Networks (GANs): A Survey," IEEE Access PP, 1 (2019) [doi:10.1109/ACCESS.2019.2905015].

[23]. X. Yi, E. Walia, and P. Babyn, "Generative Adversarial Network in Medical Imaging: A Review," Med. Image Anal. 58, 101552 (2019) [doi:10.1016/j.media.2019.101552].

[24]. X. Wang and A. Gupta, "Unsupervised Learning of Visual Representations Using Videos," in 2015 IEEE International Conference on Computer Vision (ICCV), pp. 2794-2802 (2015) [doi:10.1109/ICCV.2015.320].

[25]. R. F. Woolson, "Wilcoxon Signed-Rank Test," in Wiley Encyclopedia of Clinical Trials, pp. 1-3, American Cancer Society (2008) [doi:10.1002/9780471462422.eoct979].

[26]. R. Polikar, "Ensemble based systems in decision making," IEEE Circuits Syst. Mag. 6(3), 21-45, IEEE (2006) [doi:10.1109/MCAS.2006.1688199].

[27]. O. Sagi and L. Rokach, "Ensemble learning: A survey," Wiley Interdiscip. Rev. Data Min. Knowl. Discov. 8(4), e1249, Wiley Online Library (2018) [doi:10.1002/widm.1249].

[28]. L. Theis, A. van den Oord, and M. Bethge, "A note on the evaluation of generative models," in International Conference on Learning Representations (2016).

[29]. D. Geman et al., "Visual Turing test for computer vision systems," Proc. Natl. Acad. Sci. U.S.A 112 (2015) [doi:10.1073/pnas.1422953112].

[30]. M. Heusel et al., "GANs trained by a two time-scale update rule converge to a local Nash equilibrium," in Advances in Neural Information Processing Systems 2017-December, pp. 6627-6638 (2017) [doi:10.5555/3295222.3295408].

[31]. C. Szegedy et al., "Going deeper with convolutions," in The IEEE Conference on Computer Vision and Pattern Recognition (CVPR), pp. 1-9 (2015) [doi:10.1109/CVPR.2015.7298594].

[32]. K. Shmelkov, C. Schmid, and K. Alahari, "How good is my GAN?," in The European Conference on Computer Vision (ECCV) (2018).

[33]. J. Deng et al., "Imagenet: A large-scale hierarchical image database," in 2009 IEEE conference on computer vision and pattern recognition, pp. 248-255 (2009).

[34]. A. Radford, L. Metz, and S. Chintala, "Unsupervised representation learning with deep convolutional generative adversarial networks," arXiv Prepr. arXiv1511.06434 (2015).

[35]. M. J. M. Chuquicusma et al., "How to fool radiologists with generative adversarial networks? a visual turing test for lung cancer diagnosis," in 2018 IEEE 15th international symposium on biomedical imaging (ISBI 2018), pp. 240-244 (2018).

[36]. A. Plassard et al., "Learning Implicit Brain MRI Manifolds with Deep Learning," in Proceedings of SPIE—the International Society for Optical Engineering 10574, p. 56 (2018) [doi:10.1117/12.2293515].

[37]. D. Kingma and J. Ba, "Adam: A Method for Stochastic Optimization," Int. Conf. Learn. Represent. (2014).

[38]. T. Hastie, R. Tibshirani, and J. Friedman, "Linear Methods for Regression," in The elements of statistical learning: Data mining, inference, and prediction, pp. 43-94, Springer (2009).

[39]. L. van der Maaten and G. Hinton, "Visualizing data using t-SNE," J. Mach. Learn. Res. 9, 2579-2605 (2008).

[40] Q. Mao et al., "Mode seeking generative adversarial networks for diverse image synthesis," in Proceedings of the IEEE Conference on Computer Vision and Pattern Recognition, pp. 1429-1437 (2019).

[41] Z. Lin et al., "Pacgan: The power of two samples in generative adversarial networks," IEEE J. Sel. Areas Inf. Theory 1(1), 324-335, IEEE (2020).

[42] S.-W. Park, J.-H. Huh, and J.-C. Kim, "BEGAN v3: Avoiding Mode Collapse in GANs Using Variational Inference," Electronics 9(4), 688, Multidisciplinary Digital Publishing Institute (2020).

[43] B. Adlam et al., "Learning gans and ensembles using discrepancy," in Advances in Neural Information Processing Systems, pp. 5796-5807 (2019).

[44] P. Zhong et al., "Rethinking generative mode coverage: A pointwise guaranteed approach," in Advances in Neural Information Processing Systems, pp. 2088-2099 (2019).

[45] A. Ghosh et al., "Multi-agent diverse generative adversarial networks," in Proceedings of the IEEE conference on computer vision and pattern recognition, pp. 8513-8521 (2018).

[46] T.-H. Yu, O. Woodford, and R. Cipolla, "A Performance Evaluation of Volumetric 3D Interest Point Detectors," Int. J. Comput. Vis. 102, 180-197, Springer (2013) [doi: 10.1007/511263-012-0563-2].

[47] I. Melekhov, J. Kannala, and E. Rahtu, "Siamese network features for image matching," in 2016 23rd International Conference on Pattern Recognition (ICPR), pp. 378-383 (2016).

[48] C. Baur, S. Albarqouni, and N. Navab, "MelanoGANs: high resolution skin lesion synthesis with GANs," arXiv Prepr. arXiv1804.04338 (2018).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
generating a constrained ensemble of generative adversarial networks (GANs) by:
detecting a poorly-converged ensemble member candidate;
excluding the poorly-converged ensemble member candidate from the constrained ensemble of GANs; and
incrementally adding one or more ensemble member candidates to the constrained ensemble of GANs, wherein the constrained ensemble of GANs comprises a plurality of ensemble members;
analyzing performance of the constrained ensemble of GANs by comparing a temporary performance metric to a baseline performance metric after the one or more ensemble member candidates are added to the constrained ensemble of GANs;
halting generation of the constrained ensemble of GANs to limit membership in the constrained ensemble of GANs based on the comparison;
generating a synthetic dataset using the constrained ensemble of GANs, wherein the synthetic dataset comprises a plurality of synthetic images; and
training a machine learning algorithm using the synthetic images generated by the constrained ensemble of GANs.

2. The computer-implemented method of claim 1, further comprising:
receiving a request for synthetic data; and
generating, in response to the request, the requested synthetic data using a randomly-selected ensemble member from the constrained ensemble of GANs.

3. The computer-implemented method of claim 2, further comprising providing access to the requested synthetic data generated by the constrained ensemble of GANs.

4. The computer-implemented method of claim 1, wherein generation of the constrained ensemble of GANs is halted when a difference between the temporary performance metric and the baseline performance metric is less than or equal to a performance gap threshold.

5. The computer-implemented method of claim 1, wherein performance of the constrained ensemble of GANs is analyzed using an N-fold cross validation, bootstrapping, or hold out technique.

6. The computer-implemented method of claim 1, wherein the analysis is iteratively performed after addition of each new ensemble member of the one or more ensemble member candidates.

7. The computer-implemented method of claim 1, wherein the analysis is periodically performed after addition of a plurality of new ensemble members of the one or more ensemble member candidates.

8. The computer-implemented method of claim 1, wherein the poorly-converged ensemble member candidate is detected using a sampled Fréchet distance metric.

9. The computer-implemented method of claim 1, further comprising validating an output of the constrained ensemble of GANs.

10. The computer-implemented method of claim 9, wherein the output of the constrained ensemble of GANs is validated using a visual resemblance test.

11. The computer-implemented method of claim 1, wherein each member of the constrained ensemble of GANs comprises a respective generator neural network and a respective discriminator neural network.

12. The computer-implemented method of claim 1, wherein the constrained ensemble of GANs is configured to generate three-dimensional (3D) images.

* * * * *